(12) United States Patent
Dagan et al.

(10) Patent No.: US 11,580,589 B2
(45) Date of Patent: Feb. 14, 2023

(54) SYSTEM, METHOD, AND MEDIUM TO SELECT A PRODUCT TITLE

(71) Applicant: eBay Inc., San Jose, CA (US)

(72) Inventors: Arnon Dagan, Kfar Vitkin (IL); Alexander Zhicharevich, Givaataim (IL)

(73) Assignee: eBay Inc., San Jose, CA (US)

( * ) Notice: Subject to any disclaimer, the term of this patent is extended or adjusted under 35 U.S.C. 154(b) by 819 days.

(21) Appl. No.: 15/290,648

(22) Filed: Oct. 11, 2016

(65) Prior Publication Data

US 2018/0101893 A1   Apr. 12, 2018

(51) Int. Cl.
*G06Q 30/06*   (2012.01)
*G06F 16/9535*   (2019.01)
*G06Q 30/0601*   (2023.01)
*G06N 20/00*   (2019.01)

(52) U.S. Cl.
CPC ..... *G06Q 30/0641* (2013.01); *G06F 16/9535* (2019.01); *G06N 20/00* (2019.01)

(58) Field of Classification Search
CPC . G06Q 30/0641; G06F 16/9535; G06N 20/00
USPC .................................................... 705/26–27
See application file for complete search history.

(56) References Cited

U.S. PATENT DOCUMENTS 8,504,567 B2   8/2013   Billawala et al.
9,348,811 B2   5/2016   Hartl et al.
2007/0100666 A1*   5/2007   Stivoric ............. A61B 10/0012
                                                                705/3
2012/0047131 A1   2/2012   Billawala et al.
(Continued)

FOREIGN PATENT DOCUMENTS

CN   102549603 A   7/2012
CN   105740380 A   7/2016
(Continued)

OTHER PUBLICATIONS

L. Akritidis, A. Fevgas and P. Bozanis, "Effective Products Categorization with Importance Scores and Morphological Analysis of the Titles," 2018 IEEE 30th International Conference on Tools with Artificial Intelligence (ICTAI), 2018, pp. 213-220, doi: 10.1109/ICTAI.2018.00041. (Year: 2018).*

(Continued)

*Primary Examiner* — Matthew E Zimmerman
*Assistant Examiner* — Latasha D Ramphal
(74) *Attorney, Agent, or Firm* — Holland & Hart LLP

(57) ABSTRACT

Systems and methods to select a product title are described. The system identifies a set of item listings respectively describing items being offered for sale on a network-based marketplace. Each item listing includes a product identifier that matches and is not associated with a product title on the network-based marketplace. Each item listing also includes an item title. The system extracts feature values from the item listings and processes the feature values. The system evaluates the feature values to adopt a product title from an item title included in the set of item titles. The system generates a product user interface including the product title. Finally, the system communicates the product user interface, over a network, for display on a client machine. The product user interface includes the product title.

20 Claims, 16 Drawing Sheets

(56) References Cited

U.S. PATENT DOCUMENTS

| | | | |
|---|---|---|---|
| 2012/0233170 A1* | 9/2012 | Musgrove | G06Q 20/04 |
| | | | 707/740 |
| 2013/0060662 A1* | 3/2013 | Carlson | G06Q 30/06 |
| | | | 705/26.61 |
| 2013/0282361 A1 | 10/2013 | Hartl et al. | |
| 2014/0172652 A1 | 6/2014 | Pobbathi et al. | |
| 2016/0063590 A1 | 3/2016 | Subramanya et al. | |
| 2016/0078507 A1 | 3/2016 | Shivaswamy et al. | |
| 2016/0124933 A1* | 5/2016 | Takeuchi | G06F 40/186 |
| | | | 706/12 |
| 2017/0046763 A1* | 2/2017 | Pan | G06F 16/9566 |

FOREIGN PATENT DOCUMENTS

| | | |
|---|---|---|
| JP | 2000-148741 A | 5/2000 |
| JP | 2000-242666 A | 9/2000 |
| JP | 2014-512614 A | 5/2014 |
| JP | 2014-146136 A | 8/2014 |
| JP | 2015-529901 A | 10/2015 |
| JP | 5887031 B1 | 3/2016 |
| KR | 1020090058722 A | 6/2009 |
| WO | 2018/071545 A1 | 4/2018 |

OTHER PUBLICATIONS

International Search Report received for PCT Application No. PCT/US2017/056143, dated Jan. 4, 2018, 2 pages.

Written Opinion received for PCT Application No. PCT/US2017/056143, dated Jan. 4, 2018, 5 pages.

International Preliminary Report on Patentability received for PCT Application No. PCT/US2017/056143, dated Apr. 25, 2019, 7 pages.

Office Action received for Japanese Patent Application No. 2019-517846, dated Mar. 24, 2020, 8 pages (4 pages of Official Copy and 4 pages of English Translation).

Maezawa, Determining the importance of phrases in product titles using statistical information on "product categories" and "stores", Proceedings of the 14th Annual Meeting of the Association for Natural Language Processing, Mar. 17, 2008, 14 pages.

Office Action Received for Korean Patent Application No. 10-2019-7013388, dated Sep. 29, 2020, 14 pages (7 pages of Official Copy and 7 pages of English Translation).

Response to Office Action filed on May 27, 2020, for Japanese Patent Application No. 2019-517846, dated Mar. 24, 2020, 13 pages (7 pages of Official copy & 6 pages of English translation of claims).

Voluntary Amendment filed for Korean Patent Application No. 2019-7013388, dated May 13, 2019, 8 pages (3 pages of Official Copy and 5 pages of English Translation).

Office Action received for Korean Patent Application No. 10-2021-7024036, dated Oct. 22, 2021, 10 pages (5 pages of English translation and 5 pages of official copy).

Office Action received for Chinese Patent Application No. 201780062475.5, dated Sep. 14, 2021, 6 pages (1 page of English translation and 5 pages of official copy).

Office Action received for Chinese Patent Application No. 201780062475.5, dated Jun. 2, 2021, 7 Pages (6 pages of Official Copy and 1 page of English translation).

CNIPA, Notice of Decision to Grant Received for Chinese Patent Application No. 201780062475.5, datd Jan. 14, 2022, 10 pages.

KIPO, Final Office Action received for Korean Patent Application No. 10-2021-7024036, dated Apr. 26, 2022, 7 pages.

* cited by examiner

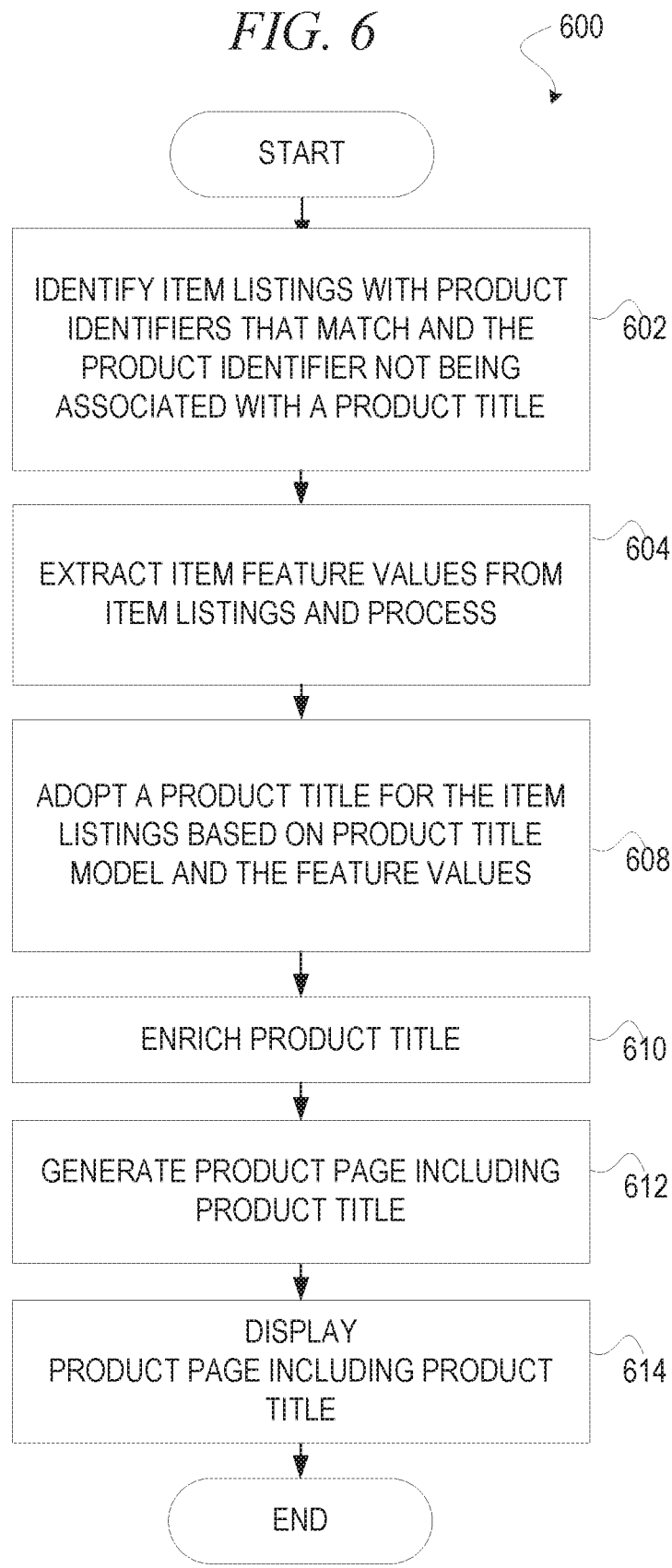

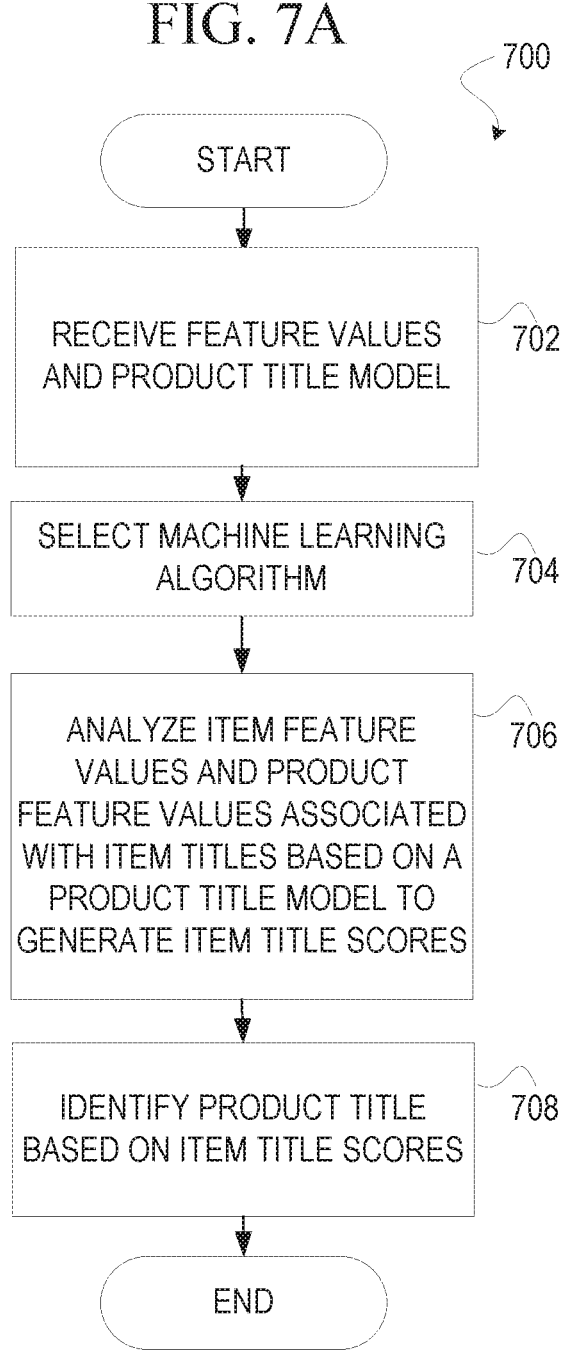

SYSTEM, METHOD, AND MEDIUM TO SELECT A PRODUCT TITLE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

Example embodiments relate generally to the technical field of preparing data for information retrieval, and in one specific example, to configuring a product title model to enable a selection of a product title.

BACKGROUND

Items being offered for sale on a network-based marketplace may exemplify a particular product. In addition the items may further be presented to an electronic community with a product webpage including a product name.

BRIEF DESCRIPTION OF DRAWINGS

Various ones of the appended drawings merely illustrate example embodiments of the present disclosure and cannot be considered as limiting its scope.

FIG. 6 illustrates a method to select a product title, according to an embodiment;

FIG. 7A illustrates a method to adopt a product title, according to an embodiment;

DETAILED DESCRIPTION

The description that follows includes systems, methods, techniques, instruction sequences, and computing machine program products that embody illustrative embodiments of the present disclosure. In the following description, for purposes of explanation, numerous specific details are set forth in order to provide an understanding of an embodiment of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
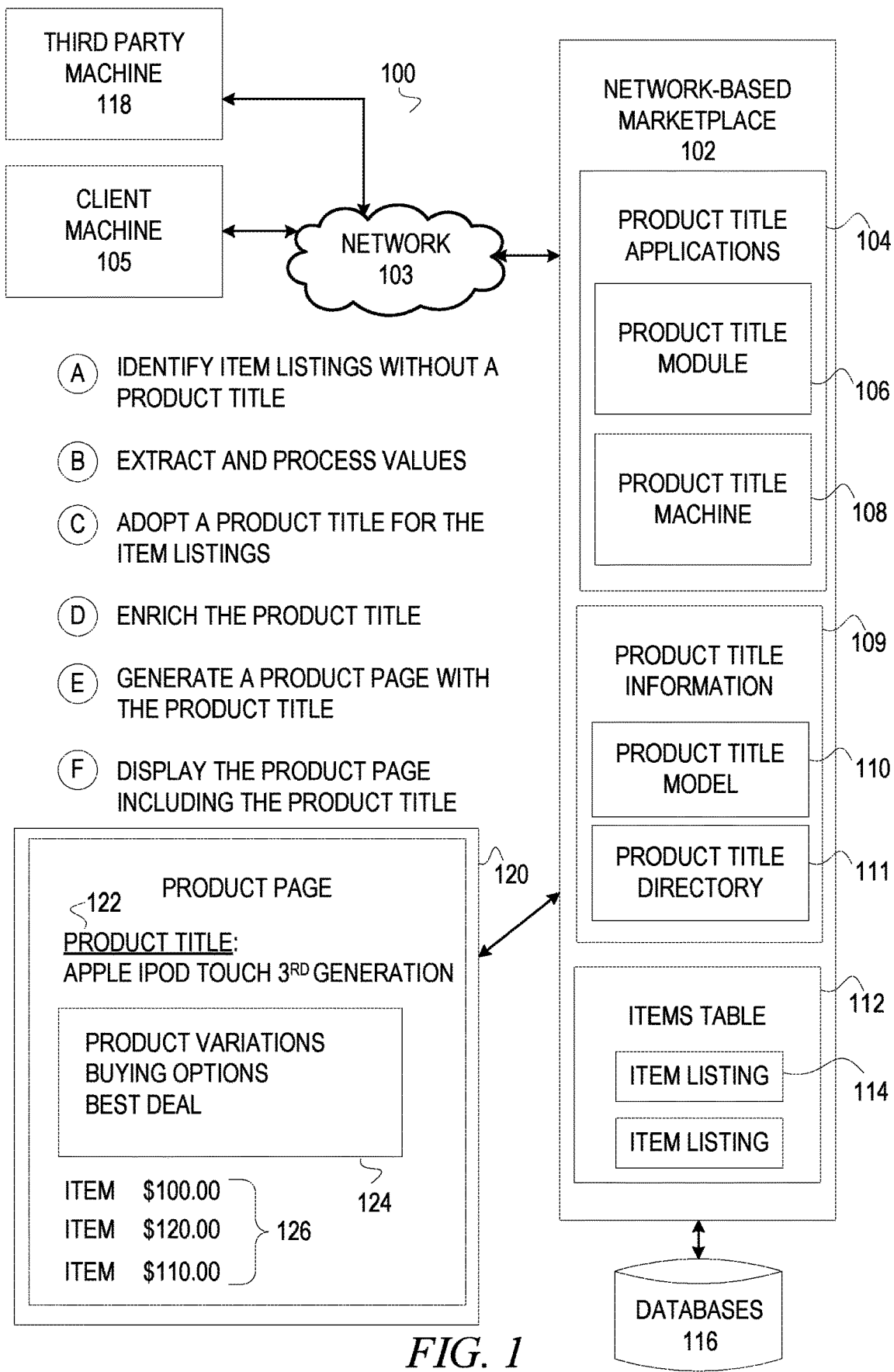
FIG. 1 illustrates a system, according to an embodiment, to select a product title.

FIG. 1 illustrates a system 100, according to an embodiment, to select a product title. The system 100 may select the product title from a set of item titles respectively associated with items that exemplify the same product but have not previously been associated with a product title by the system 100. That is, a manufacturer's title for a product, although available, is not used. Rather, the system 100 selects the product title from a set of item titles that have been submitted by users of an electronic community on the Internet. To this end, a product title machine including a machine learning algorithm utilizing a product title model is being utilized to select the product title. The machine learning algorithm may be taught to distinguish between so called "good" and "bad" item titles by iteratively training the product title model with multiple sets of item listings that respectively include item titles that are tagged as "good" or "bad." Further, the product title model may be uniquely configured to direct the product title machine to extract multiple and diverse item features and product features from the item listings for processing and analysis, thereby enabling a more efficient selection of a product title. Configuring the product title model, as set forth in the present disclosure, improves the functioning of a product title machine for the reason that a relevant and salient selection of item features and product features, as defined in the product title model, decreases the utilizing of computing resources to select a "good" product title. Accordingly, one problem being presented and solved by the present disclosure is how to configure a product title model to enable a product title machine that utilizes the product title model to efficiently select a "good" product title for a product and where the selection of the "good" product title is cognizant of the ebbs and flows of human dialogue in an electronic user community that trades and communicates on the Internet.

In the present example, the system 100 may include a network-based marketplace that may select the product title from a set of item titles associated with a set of items respectively exemplifying the same product but not previously being associated with a product title by the network-based marketplace. To this end, the network-based marketplace includes a product title machine that executes a machine learning algorithm in an online mode to select the product title from the set of item titles. The machine learning algorithm utilizes a product title model that is trained in an off-line mode, according to some embodiments. The product title model defines item features and product features that are analyzed by the product title machine to adopt one of the item titles as the product title. An item feature may define a data extraction from an item listing and an initial processing of the extracted data before it is analyzed by the machine learning algorithm. For example, the item feature, "title length," may define the extracting of an item title from an item listing and an initial processing that includes counting the number of characters in the item title. A product feature may define data that is extracted from each item in a set of items and an initial processing of the extracted data before it is processed by the machine learning algorithm. For example, the product feature, "average title length," may define the extracting of an item title from each item listing in the set of items and an initial processing that includes counting the number of characters in each of the extracted item titles and dividing by the number of item listings in the set of item listings. The network-based marketplace may select the product title to facilitate the presentation of the product title on a product page that includes items being offered for sale on the network-based marketplace and exemplifying the same product.

The system 100 is now described in greater detail. The system 100 includes a network-based marketplace 102 communicating over a network 103 with a client machine 105. The network-based marketplace 102 provides an electronic marketplace for the purchase of goods and services and an electronic forum in which sellers and buyers may communicate with each other. To this end, the buyers and sellers may operate client machines, such as the client machine 105, to communicate with the network-based marketplace 102 and execute transactions for the transfer of the goods and services (e.g., items). The network-based marketplace 102 includes product title applications 104, product title information 109, and an items table 112. The product title applications 104 may include a product title module 106 and a product title machine 108. The product title module 106 may identify item listings 114 in an items table 112 without an associated product title, extract feature values from item listings 114, process the extracted feature values, invoke the product title machine 108 to adopt a product title based on the extracted and pre-processed feature values, enrich the product title, generate a product page including the product title, and display the product page. The product title machine 108 may be utilized to adopt a product title from the set of item titles corresponding to a set of item listings. The product title information 109 includes a product title model 110 and a product title directory 111. The product title machine 108 utilizes the product title model 110 and the extracted and preprocessed feature values to adopt the product title. The product title machine 108 utilizes learning that is stored in the product title model 110 to adopt the product title. The product title machine 108 stores the learning while operating in an off-line training mode. The product title directory 111 associates a product identifier with a product title. The items table 112 stores item listings 114 describing items being offered for sale on the network-based marketplace 102.

The network-based marketplace 102 is further shown to be communicatively coupled to a database 116 and a third party machine 118. The database 116 may be utilized by the network-based marketplace 102 to persistently store the product title information 109, the items table 112, and other data structures. The third party machine 118 may be utilized by the network-based marketplace 102 as an alternate source of item listings 114 to select a product title, according to another embodiment. Further, the third party machine 118 may execute the product title applications 104 to select a product title, according to another embodiment.

A product page 120 includes a product title 122, product descriptors 124, and items 126 that exemplify a particular product. The product title applications 104 may be utilized to generate the product title 122 in association with a product identifier (e.g., International Standard Book Number (ISBN)). For example, the product page 120 includes the product title 122, "APPLE IPOD TOUCH $3^{RD}$ GENERATION" and the product descriptors, "PRODUCT VARIATIONS," describing product variations, "BUYING OPTIONS," providing buying options such as auction, purchase, and the like, and "BEST DEAL," describing the best deal available for the product.

A method to select a product title is described in further detail. At operation "A," the product title module 106 may identify a set of item listings 114 in the items table 112. The product title module 106 identifies each item listing as including a particular product identifier that is not associated with a product title 122 on the network-based marketplace 102. At operation "B," the product title module 106 extracts item feature values and product feature values from the set of item listings and preprocesses the extracted feature values. At operation "C," the product title machine 108 utilizes a machine learning algorithm to analyze the extracted and pre-processed feature values to adopt a product title 122 from the item titles in the set of item listings 114. The machine learning algorithm utilizes a product title model 110 that has been previously trained in an off-line mode to enable the machine learning algorithm to adopt a "good" product title. The product title model 110 defines and weights the item features and product features that are utilized to select the product title 122. At operation "D," product title module 106 may enrich the product title 122 that was selected. For example, the product title module 106 may change the casing of a letter from lower case to upper case in a particular word (e.g., "ebay"="eBay") of a product title to enrich the product title. Other enrichments may also be performed. At operation "E," product title module 106 may generate a product page 120 including the product title 122. At operation "F," the product title module 106 may communicate the product page 120 over the network for display on the monitor of a client machine 105.

Figure 2A:
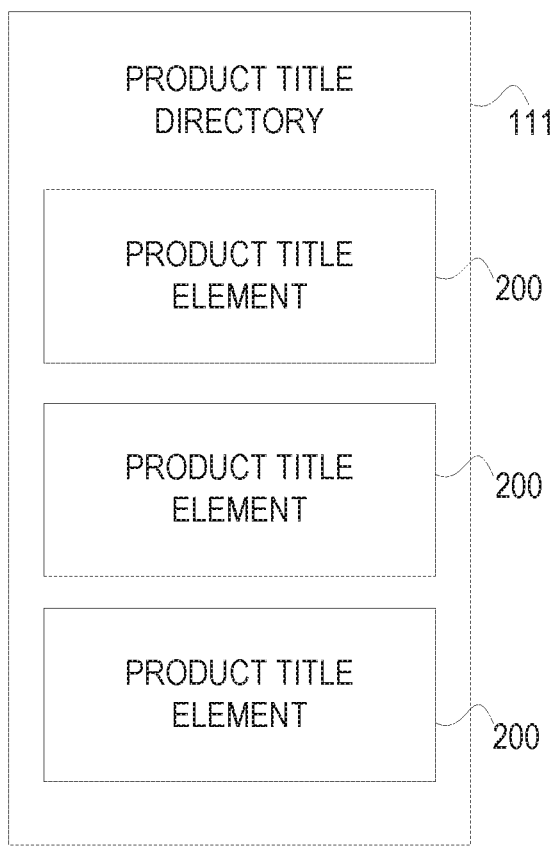
FIG. 2A illustrates a product title directory, according to an embodiment.

FIG. 2A illustrates a product title directory 111, according to an embodiment. The product title directory 111 may include product title elements 200 that are utilized by product title applications 104 to identify whether a product title 122 has been adopted.

Figure 2B:
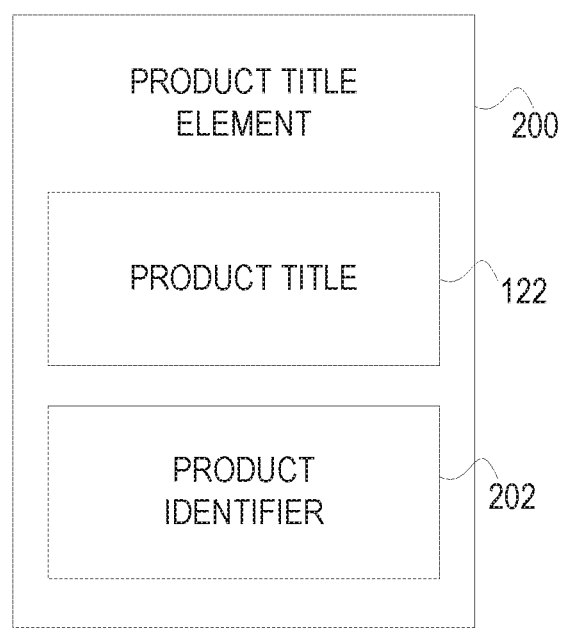
FIG. 2B illustrates product title element, according to an embodiment.

FIG. 2B illustrates product title element 200, according to an embodiment. The product title element 200 may include a product title 122 and a product identifier 202. The product title 122 may include a string of letters, numbers, or special characters to form a product title 122. For example, the product title 122 may be extracted from an item title of an item listing 114 and, optionally, enriched for display on the product page 120, as shown on FIG. 1. In some instances, the product title 122 may not be initialized, thereby signifying a product title 122 has not been selected for the associated product identifier 202. For example, the product title 122 may contain a null value ("0") signifying a product title 122 has not been adopted for the associated product identifier 202.

The product identifier 202 may include a product identifier type and a product identifier value. The product identifier type characterizes a particular scheme of product identifiers. For example, product identifier types may include a Universal Product Code (UPC), a European article number (EAN), a Japanese Article Number (JAN), an ISBN, a manufacturer part number (MPN), and the like. The product identifier value uniquely identifies a product for the product identifier type. For example, a product identifier value of "123456" may uniquely identify a UPC product.

Figure 3A:
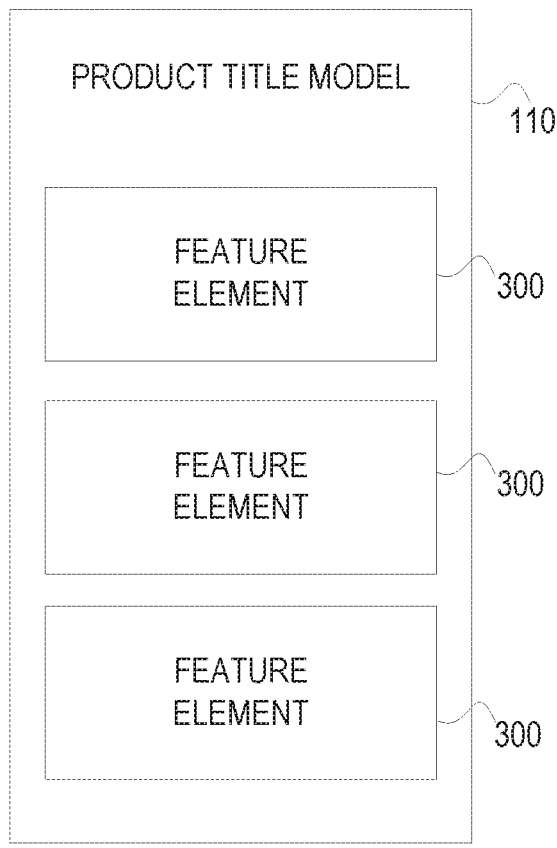
FIG. 3A illustrates product title model, according to an embodiment.

FIG. 3A illustrates product title model 110, according to an embodiment. The product title model 110 may be utilized by the product title machine 108 to adopt a product title. The product title model 110 may further store learning that, according to some embodiments, is acquired in a training mode. The product title model 110 may include multiple feature elements 300 that define features that are analyzed by the product title machine 108.

Figure 3B:
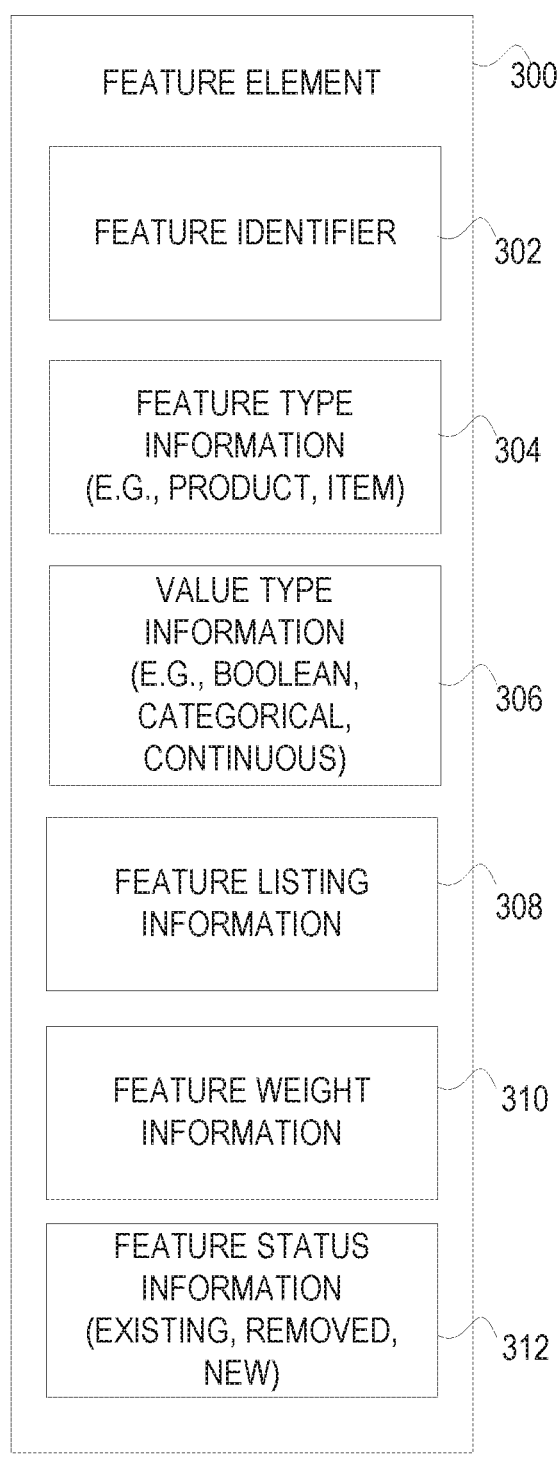
FIG. 3B illustrates a feature element, according to an embodiment.

FIG. 3B illustrates a feature element 300, according to an embodiment. The feature element 300 may include a feature identifier 302, feature type information 304, value type information 306, feature listing information 308, feature weight information 310, and feature status information 312. The feature identifier 302 uniquely identifies a feature element 300 in the product title model 110. The feature type information 304 signifies whether the feature is an "item feature" or a "product feature." The "item feature" defines a feature value that characterizes a particular item listing 114. The product feature defines a feature value characterizing a particular item listing 114 in relation to the set of item listings (e.g., product). The value type information 306 stores whether the feature element is a Boolean, categorical, or continuous. Boolean signifies a feature element 300 with a value of TRUE or FALSE, PASS or FALL, and the like. Categorical signifies a feature element 300 in the form of predetermined values. For example, the predetermined feature, "color," may be associated with the predetermined values of "red," "green," "blue," and the like. Continuous signifies a feature element 300 in the form of numeric. For example, the feature, "average number of characters" may be expressed as the number "33."

The feature listing information 308 defines an extraction of data from an item listing 114 and a preprocessing of the extracted data to generate a feature value in the form of a Boolean, categorical, or continuous. The feature value may be utilized by the machine learning algorithm to select a product title.

Non-exhaustive lists of example feature listing information 308 are provided below. Tables 1-4 describe examples of item features and Table 5 provides examples of product features.

TABLE 1 describes item features defining an extraction of an item title 114 from an item listing 114 and preprocessing of the item title 400 to generate a Boolean. The Boolean may be subsequently utilized by the product title machine 108 to adopt a product title 122.

TABLE 1

Item Feature - Title extraction, Boolean

| Feature ID | Feature | Example |
|---|---|---|
| 1 | upper/lower casing | g debr g debrekht kodiak family ornament |
| 2 | quantity | iotaSAKS Shopper-Style - Farm Stand - Set of 3 Saks - Reuseable Shopping Totes |

TABLE 1-continued

Item Feature - Title extraction, Boolean

| Feature ID | Feature | Example |
|---|---|---|
| 3 | condition | Very Volatile Clyde Womens Size 6 Black Fashion Knee-High Boots New/Display |
| 4 | duplicate tokens | G. Loomis NativeRun GLX Fly and Spey Rods FR1147 4 GLX |
| 5 | bundle token | Essentials Bundle for Fuji X-A1 X-E1 X-E2 X-M1 X-T1 with 16-50 mm or 18-55 mm Lens |
| 6 | keyword stuffing | Fuel Shut Off For Massey Ferguson Tractor 3140 360 3645 364s 3655 396 |

Feature "1" (e.g., Feature ID "1") results in PASS if all of the characters in an item title 400 are upper case or lower case. Accordingly, PASS is generated for the example because all of the characters in the example, "g debr g debrekht kodiak family ornament," are lower case.

Feature "2" results in PASS if a quantity token is not found in the item title 400. Accordingly, FAIL is generated because the example, "Set of 3 Saks," includes a quantity token (e.g., "Set of 3").

Feature "3" results in PASS if a condition token(s) is not found in the item title 400. Accordingly, FAIL is generated because the example item title 400, "Very Volatile Clyde Womens Size 6 Black Fashion Knee-High Boots New/Display," includes a condition token, "New/Display."

Feature "4" results in PASS if no duplicate tokens are found in the item title 400. Accordingly, FAIL is generated because the example item title 400, "G. Loomis NativeRun GLX Fly and Spey Rods FR1147 4 GLX" includes the duplicate tokens, "GLX" and "GLX."

Feature "5" results in PASS if no tokens exhibiting bundling are found in the item title 400. Accordingly, FAIL is generated because the example item title 400, "Essentials Bundle for Fuji X-A1 X-E1 X-E2 X-M1 X-T1 with 16-50 mm or 18-55 mm Lens" includes a token exhibiting bundling ("Essentials Bundle"). Whether a token exhibits bundling may be identified based on a token bundling list, according to an embodiment. For example, Feature "5" results in PASS if no token in the item title 400 matches a token in the token bundling list.

Feature "6" results in PASS if no keyword stuffing is found in the item title 400. Accordingly, FAIL is generated because the example item title 400, "Fuel Shut Off For Massey Ferguson Tractor 3140 360 3645 364s 3655 396" includes the keywords "3140," "360," "3645," "364s," "3655," and "396." Whether a token exhibits stuffing may be identified based on a keyword stuffed list, according to an embodiment. For example, Feature "6" results in PASS if no token in the item title 400 matches a token in the keyword stuffed list.

TABLE 2 describes item features defining an extraction of an item title 114 from an item listing 114 and preprocessing of the item title to generate a Boolean. The Boolean may be subsequently utilized by the product title machine 108 to adopt a product title 122.

TABLE 2

Item Feature - Title extraction, Boolean (continued)

| | | |
|---|---|---|
| 7 | shipping token | 10' × 10' Rap Mansion and Car Combo Hip Hop Background Backdrop FREE SHIPPING to . . . |

TABLE 2-continued

Item Feature - Title extraction, Boolean (continued)

| | | |
|---|---|---|
| 8 | missing data | Taylor Three Light Pendant Holder in Merlot Bronze {missing brand} |
| 9 | special characters | 8' × 8' MANSION AND CAR COMBO URBAN RAP CLUB HIP HOP BACKDROPÂ® BACKGROUND |
| 10 | price | Standard Horizon GX1300B Eclipse Ultra Compact Fixed Mount VHF Black $30 Rebate |
| 11 | descriptive words | Best Of Harry Belafonte - Harry Belafonte 743217894825 (CD Used Very Good) |

Feature "7" results in PASS if no shipping tokens are found in the title. FAIL is generated because the example item title 400, "10'×10' Rap Mansion and Car Combo Hip Hop Background Backdrop FREE SHIPPING to . . . " includes the shipping token "FREE SHIPPING."

Feature "8" results in PASS if no "missing data" is found in the item title 400. Whether an item title 400 exhibits "missing data" may be defined based on a required data list, according to an embodiment. For example, Feature "8" results in PASS if a token in the item title 400 matches a token in a required data list. In the example, the result is FAIL because the example item title 400, "Taylor Three Light Pendant Holder in Merlot Bronze" does not include a token that matches at least one token in the required brand data list.

Feature "9" results in PASS if special characters are not found in the title. FAIL is generated because the example item title 400, "8'×8' MANSION AND CAR COMBO URBAN RAP CLUB HIP HOP BACKDROPÂ® BACKGROUND" includes a token with special character "®."

Feature "10" results in PASS if a price is not found in the title. FAIL is generated because the example item title 400, "Standard Horizon GX1300B Eclipse Ultra Compact Fixed Mount VHF Black $30 Rebate" includes the token "$10.00."

Feature "11" results in PASS if no descriptive words are found in the item title 400. FAIL is returned because the example item title 400, "Best Of Harry Belafonte—Harry Belafonte 743217894825 (CD Used Very Good)" includes the token "Best of." FAIL, might also be generated because the token "Very Good" is found in the item title 400. For example, the descriptive words might be identified based on a list including words that are characterized as "descriptive."

TABLE 3 describes item features defining at least an extraction of data from an item listing 114. The features "12," "13," and "14" define different types of data being extracted from the item listing 114. Further, the item features "12" and "13" are not associated with preprocessing but are utilized as a simple extraction by the product title machine 108 in the form of a categorical. Feature "14" defines further preprocessing of the extracted data to also generate a feature value in the form of categorical. Each categorical may be subsequently utilized by the product title machine 108 to adopt a product title 122.

TABLE 3

Item Feature, category extraction - categorical

| Feature ID | Feature | Example |
|---|---|---|
| 12 | which-meta | "electronics" |
| 13 | which-leaf | "car audio" |

TABLE 3-continued

Item Feature, category extraction - categorical

| Feature ID | Feature | Example |
|---|---|---|
| 14 | title size bucketing | Bucket "A" 01-10 characters |
| | | Bucket "B" 11-20 characters |
| | | Bucket "C" 21-30 characters |
| | | Bucket "D" 31-40 characters |
| | | Bucket "E" 41-50 characters |

Feature "12" results in extracting a meta-category. A meta-category is extracted from the meta category position of category information 420 in the item listing 114. The example meta category, "ebay," is an extraction from the category information 420 illustrated in FIG. 5 (e.g., "ebay/electronics/car electronics/car audio").

Feature "13" results in extracting a leaf-category. A leaf category is extracted from the leaf category position of the category information 420 in the item listing 114. The example leaf category, "car audio," is an extraction from the category information 420 illustrated in FIG. 5 (e.g., "ebay/electronics/car electronics/car audio").

Feature "14" results in identifying a bucket identifier. Feature 14 defines an extraction of the item title 400 from the item listing 114 and preliminary processing including counting the number of characters in the item title 400, comparing the number of characters to a set of character ranges (e.g., 01-10 characters) respectively associated with buckets designated by predetermined values (e.g., "A," "B," "C," "D," or "E") to identify a particular bucket, and identifying the matching bucket. "Bucket "D" is identified as the matching bucket because a title, "Samsung Galaxy Note Edge SM-N915A" has thirty-three characters and thirty-three characters is the length associated with the "Bucket "D."

TABLE 4 describes item features defining an extraction of an item title 400 from an item listing 114 and preprocessing to generate a feature value in the form of a numeric. The numeric may be subsequently utilized by the product title machine 108 to adopt a product title 122.

TABLE 4

Item Feature - title extraction - numeric

| Feature ID | Feature | Example |
|---|---|---|
| 15 | title size | "Samsung Galaxy Note Edge SM-N915A" |

Feature "15" results in generating a title size. Feature 15 defines an extraction of the item title 400 from the item listing 114 and preliminary processing including counting the number of characters in the title. A title size of thirty-three is counted for the example item title 400, "Samsung Galaxy Note Edge SM-N915A."

TABLE 5 describes product features that generate continuous feature values in the form of a numeric that describes a comparison of a particular item listing with a set of item listings 114 comprising a product.

TABLE 5

Product Feature - title - continuous

| Feature ID | Feature | Example |
|---|---|---|
| 16 | title size v. product title average size | "Samsung Galaxy Note Edge SM-N915A" "Samsung Note Edge SM-N915A" "Samsung Galaxy Note SM-N915A" |
| 17 | item price v. product average price | $1.00 $2.00 $3.00 |

Feature "16" generates a ratio that is computed by dividing a size of an item title 400 by an average size associated with a product. Feature 16 defines an extraction of the item titles 400 (e.g., "Samsung Galaxy Note Edge SM-N915A," "Samsung Note Edge SM-N915A," "Samsung Galaxy Note SM-N915A") from a set of item listings 114 comprising a product and preliminary processing including counting the number of characters in each of the item titles 400, computing a product average title size based on the number of characters, and dividing the size of an item title 400 associated with a particular item listing 114 by the product title average size. For example, thirty-three characters are counted in the item title 400 "Samsung Galaxy Note Edge SM-N915A," twenty-six characters are counted in the item title 400 "Samsung Note Edge SM-N915A," and twenty-eight characters are counted in the item title 400 "Samsung Galazy Note SM-N915A." The average product title size is computed to be twenty-nine characters (e.g., 33+26+28=29). The second item title 400, "Samsung Note Edge SM-N915A," may be selected as a trial. The second item title 400 has twenty-six characters and is divided by the product title average size of twenty-nine characters. Accordingly, the product feature value utilized by the machine learning alogorithm for the second item title 400 is computed (26/29=0.896).

Feature "17" generates a ratio that is computed by dividing a price (e.g., "item price") 180 from an item listing 114 by an average price associated with a product (e.g., "product average price"). Feature 17 defines an extraction of price 408 (e.g., $1.00, $2.00, $3.00) from the three item listings 114 in a set of item listings 114 (e.g., product) and preliminary processing including computing a product average price based on the three prices 408 that were extracted, and dividing a price 408 associated with a particular item listing 114 by the product title average price. For example, the average product price for the example prices provided is computed (($1.00+$2.00+$3.00)/3=$2.00) to be $2.00. The first price 408 of $1.00 may be selected as a trial. Accordingly, the product feature value utilized by the machine learning alogorithm for the price 408, $1.00, is computed ($1.00/$2.00=0.50).

TABLE 6 describes product features that generate a Boolean feature values.

TABLE 5

Product Feature - title - Boolean

| Feature ID | Feature | Example |
|---|---|---|
| 18 | title contains first most frequent token | "Dog brown" "Cat brown" "Parrot red" |

TABLE 5-continued

Product Feature - title - Boolean

| Feature ID | Feature | Example |
|---|---|---|
| 19 | title contains second most frequent token | "Dog brown" "Cat brown" "Parrot red" |

Feature "18" generates PASS for an item title that contains the first most frequent token. Feature 18 defines an extraction of item titles 400 (e.g., "Dog brown," "Cat brown," "Parrot red") from item listings 114 comprising a product and preliminary processing including generating a token frequency matrix, and returning PASS responsive to identifying a particular item title 400 as including a token that includes the most frequently used token. For example, consider the below token/frequency matrix generated from the example item titles 400 in TABLE 6.

TABLE 6

Token/Frequency Matrix

| Token | Frequency |
|---|---|
| Brown | 2 |
| Red | 1 |
| Dog | 1 |
| Cat | 1 |
| Parrot | 1 |

Accordingly, the product feature value utilized by the machine learning alogorithm for the item title 400, "Dog Brown," and the item title, "Cat Brown" is PASS because "Brown" is associated with the highest token frequency but item title 400, "Parrot Red" is FAIL because neither "Parrot" nor "Red" are associated with the highest token frequency.

Feature "19" generates PASS if an item title 400 contains the second most frequently used token. Feature 19 defines a similar extraction and processing as Feature 18 but returns PASS responsive to an identification of the second most frequently used token. Accordingly, the product feature value utilized by the machine learning alogorithm for the item title 400, "Dog Brown," the item title 400, "Cat Brown," or the item title 400, "Parrot Red" is PASS because each of the three item titles 400 contains a token identified as the second most frequently used token (e.g., "Red," "Dog," "Cat," "Parrot").

The feature weight information 310 stores a weight that is used to compute an item title score for an item title 400 in an item listing 114. The product title machine 108 may increase or decrease the weight in response to learning. For example, the product title machine 108 may increase the weight from "10" to "20" to increase the importance of the corresponding feature element 300 in computing an item title score. Also for example, the product title machine 108 may decrease the weight from "30" to "10" to decrease the importance of the feature element 300 in computing an item title score. As another example, the product title machine 108 may signify a feature element 300 is not relevant for selecting a product title 122 by storing "0" in the feature weight information 310 for the feature element 300.

The feature status information 312 signifies a status for the feature element 300. For example, the status may signify the feature element 300 is added (e.g., NEW), existing (EXISTING), or removed (REMOVED).

Figure 4A:
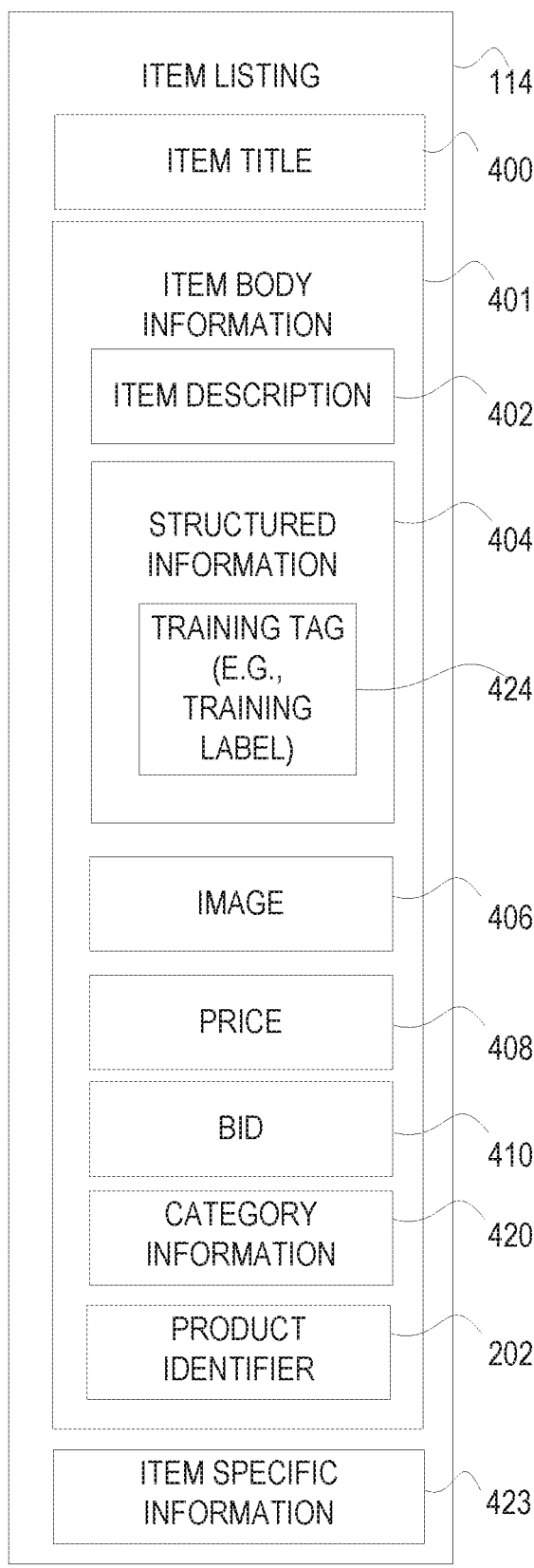
FIG. 4A illustrates an item listing, according to an embodiment.

FIG. 4A illustrates an item listing 114, according to an embodiment. The item listing 114 describes an item that is being offered for sale on the network-based marketplace 102. The item listing 114 may be entered by a seller who is selling an item. The item listing 114 may include an item title 400, an item body information 401, and item specific information 423. The item title 400, the item body information 401, and the item specific information 423 may be identified by a product title element 200 for utilization by the product title machine 108 to adopt a product title 122. For example, a product title element 200 may identify a specific extraction of data from the item title 400, the item body information 401, and/or the item specific information 423 and, optionally, preprocess to adopt the product title 122.

The item title 400 is a title for the item. The item body information is common to all types of items and includes an item description 402, structured information 404, an image 406 of the item, a price 408 to purchase the item, a bid 410 including the current highest bid for the item, category information 420 signifying one or more categories where the item listing 114 may be found in a navigable hierarchy of categories, and a product identifier 202. The item title 400 is the title of the item listing 114 and may be adopted by the product title machine 108 for possible enrichment as a product title 122. The item description 402 may include alphanumeric text describing the item. The structured information 404 may include one or more attribute-value pairs. For example, the structured information, "COLOR=BLUE," may be received from a seller to identify the color of an item that is described by the item listing 114 and being offered for sale on the network-based marketplace 102. Further for example, the structured information 404, "ITEM TITLE=GOOD" or "ITEM TITLE=BAD," may be received from an operator in the form of a training tag 424 (e.g., label) to train a machine learning algorithm that the item title 400 in the item listing 114 is a "GOOD" or "BAD" item title 400 for the product identifier 202 in the item listing 114. In like manner, other structured information 404 may be automatically generated by the network-based marketplace 102 or received from a user (e.g., seller). The product identifier 202 was previously described. The item specific information 423 stores information that is unique for the type of item. For example, electronic devices include item specific information 423 that is specific to electronic devices. For example, the item specific information 423 may include a quantity of memory, a type microprocessor, and the like. In contrast, automobiles have item specific information 423 that are specific to automobiles including tires, engine sizes, acceleration measurements, and the like.

Figure 4B:
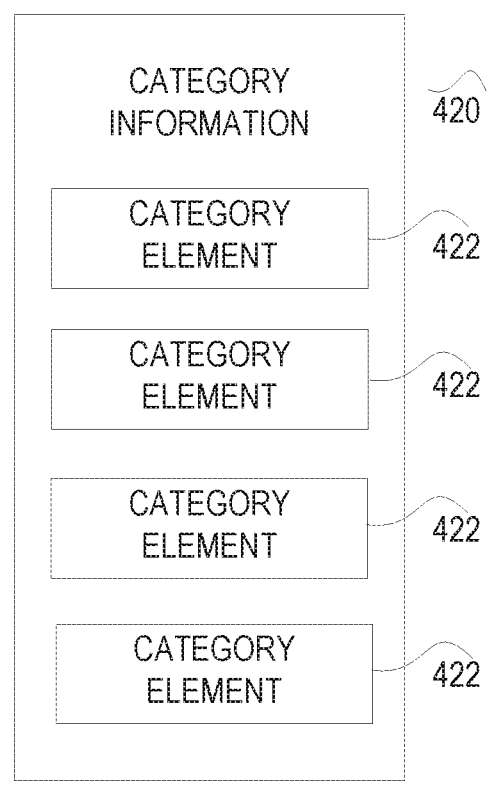
FIG. 4B illustrates category information, according to an embodiment.

FIG. 4B illustrates category information 420, according to an embodiment. The category information 420 may include one or more category elements 422. The one or more category elements may respectively correspond to domains in a path comprising a hierarchy of categories. For example, the path "eBay/electronics/car electronics/car audio" includes four category elements respectively corresponding to the domains "eBay," "electronics," "car electronics," and "car audio."

Figure 4C:
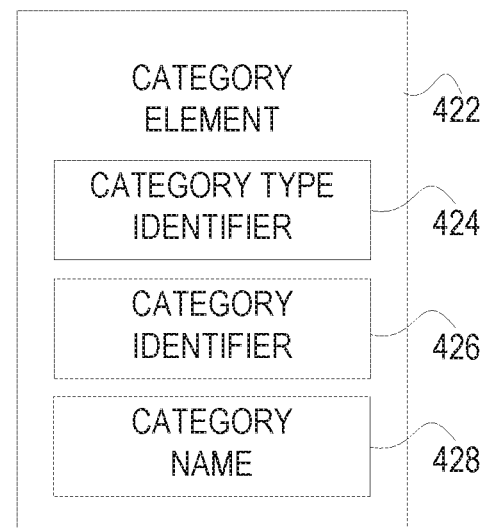
FIG. 4C illustrate a category element, according to an embodiment.

FIG. 4C illustrate a category element 422, according to an embodiment. The category element 422 may include a category type identifier 426, a category identifier 426, and a category name 428. The category type identifier 426 may identify the position of the category element 422 in a hierarchy of categories. For example, the category element 422 "SITE CATEGORY" signifies a site domain (e.g., eBay), the category element 422 "META CATEGORY" signifies a domain immediately below a "SITE CATEGORY," the category element 422 "SUB-META CATEGORY" signifies a category between a "META CATEGORY" and a "LEAF CATEGORY," and the category element 422 "LEAF CATEGORY" signifies a category below a "META CATEGORY" and possibly containing item listings 114. The category name 428 includes the name of a category (e.g., "eBay").

Figure 5:
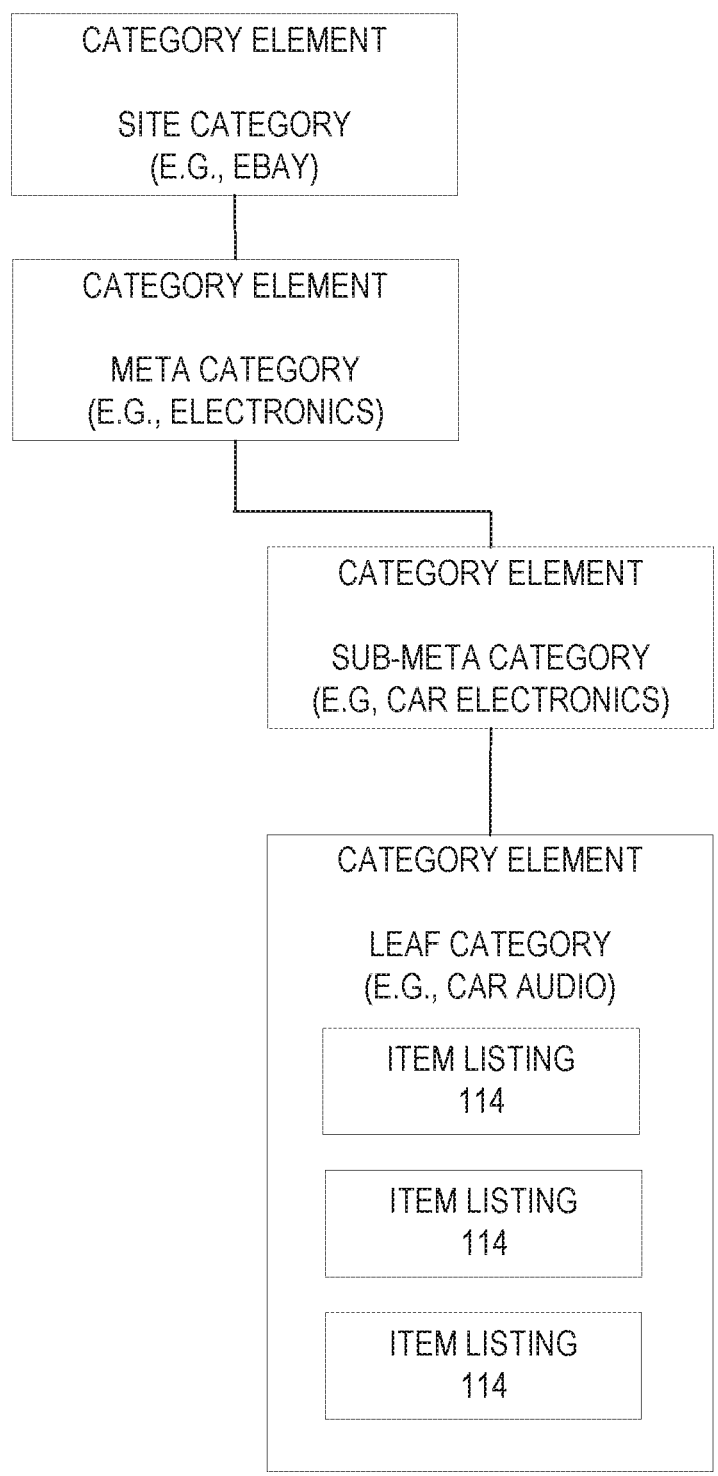
FIG. 5 illustrates category information, according to an embodiment.

FIG. 5 illustrates a hierarchy of categories 500, according to an embodiment. The hierarchy of categories 500 illustrates the path "eBay/electronics/car electronics/car audio." The category "eBay" is a site category because it identifies a website. The category "electronics" is a meta category. The category "car electronics" is a sub-meta category. The category "car audio" is a leaf category because it may include item listings 114.

FIG. 6 illustrates a method 600 to select a product title, according to an embodiment. The method 600 commences at operation 602 with the product title module 106 identifying a set of item listings 114 for selecting a product title 122. For example, the product title module 106 may scan the product title directory 111 to identify a product identifier 202 that is not associated with a product title 122. Further, the product title module 106 may scan the items table 112 to identify a set of item listings 114 that match the product identifier 202 that was identified. Merely for example, the product title module 106 may identify a set five-hundred item listings 114 with a product identifier 202 that was identified as not associated with a product title 122.

Figure 8:
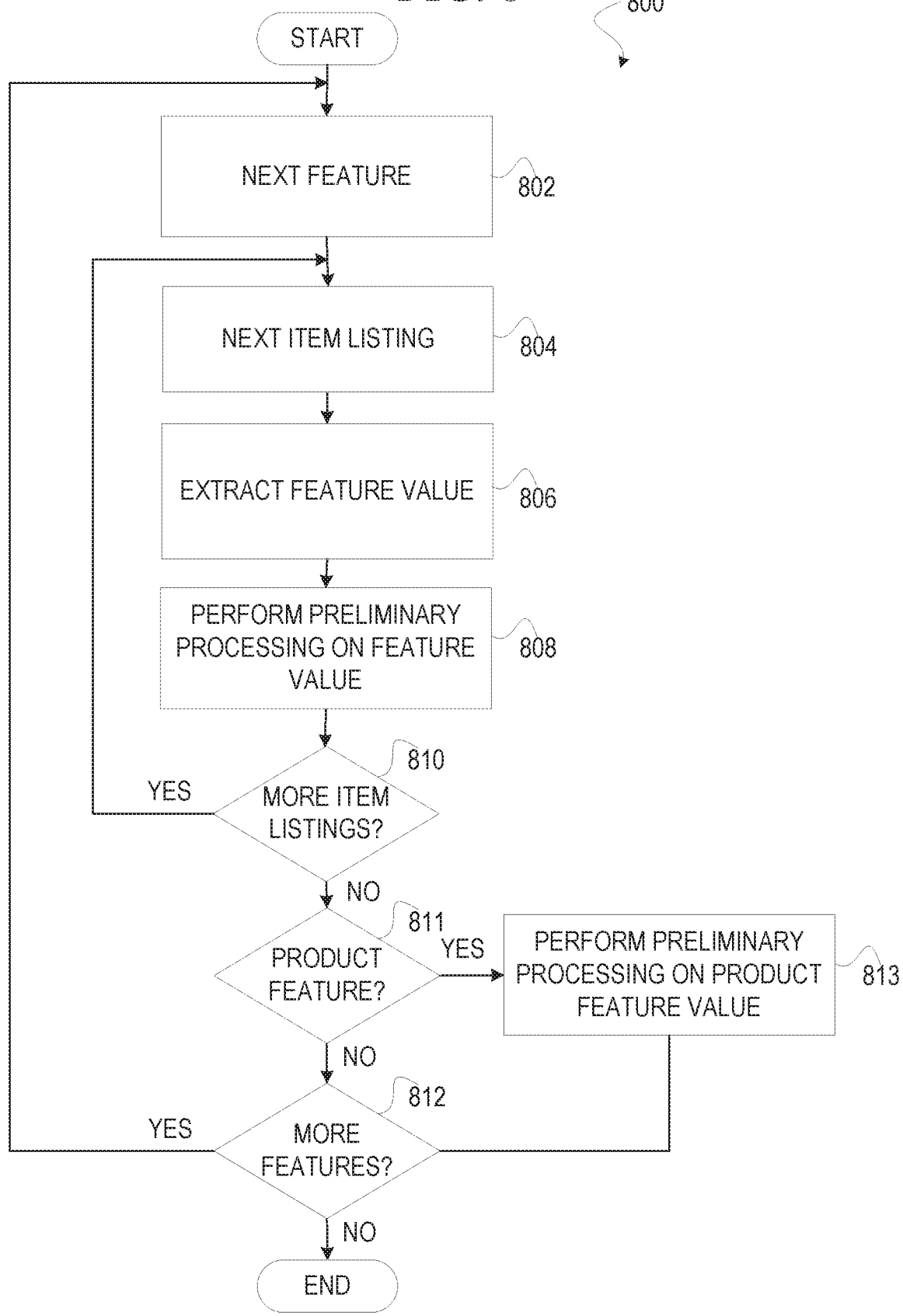
FIG. 8 illustrates a method to extract and process feature values.

At operation 604, the product title module 106 extracts feature values from item listings 114 and, optionally, preprocesses the extracted feature values. The feature values include item feature values and product feature values. Operation 604 is further described by a method 800 that is illustrated in FIG. 8.

At operation 608, the product title module 106 invokes the product title machine 108 to adopt a product title 122. For example, the product title module 106 may invoke the product title machine 108 with the extracted pre-processed item feature values, the extracted pre-processed product feature values, and the product title model 110. Operation 608 is further described by a method 700 that is illustrated in FIG. 7A.

At operation 610, the product title module 106 enriches the product title 122 that was selected. Enrichment may include applying upper case lettering or lower case lettering to a letter in the product title 122. For example, the product title module 106 may enrich the product title 122, "ipod music player for sale" to "iPod music player for sale." In another example, the product title module 106 may enrich the product title 122, "IPOD music player for sale" to "iPod music player for sale." The product title module 106 may be enabled to identify the true casing for a letter in a token by scanning the item listings 114 in the items table 112 to identify all possible casings for the letters in a particular token and by selecting the most frequent casing form for each letter in a token. Further, the product title module 106 might utilize a country identifier (e.g., USA, Germany, France, Italy, etc.) to identify the country specific casing for letters in a particular token. For example, the country identifier may be identified based a category element 422 "SITE CATEGORY" signifying a domain in Germany (e.g., eBayGermany). Further for example, the country identifier for Germany might be utilized to enhance a product title 122 from "Deutsche Bank ag" to "Deutsche Bank AG" where the letters "AG" signify an incorporated company in accordance with German custom. Accordingly, the product title module 106 may perform country specific enrichments. In addition, the product title module 106 may enhance a product title 122 by adding a brand. For example, the product title module 106 may enrich the product title 122, "iPod music player for sale" to "Apple iPod music player for sale" where the brand name "Apple" is being added to the product title 122. In addition, the product title module 106 may enhance a product title 122 by adding a model. For example, the product title module 106 may enrich the product title 122, "Apple iPod music player for sale" to "Apple iPod music player for sale—7$^{th}$ Generation" where the module "7$^{th}$ Generation" is being added to the product title 122.

At operation 612, the product title module 106 may generate a product page 120 including the product title 122. For example, the product page 120 shown on FIG. 1 may be generated.

At operation 614, the product title module 106 may communicate a product page 120 over a network for display on a monitor of a client machine 105. For example, the product page 120 shown on FIG. 1 may be communicated.

FIG. 7A illustrates a method 700 to adopt a product title 122, according to an embodiment. The method 700 commences, at operation 702, with the product title machine 108 receiving the item feature values, the product features values, a set of item listings 114, and the product title model 110. For example, the product title machine 108 may receive the item feature values and product features values, a set of five-hundred item listings 114 that were utilized to generate the feature values, and a product title model 110 that was previously trained.

At operation 704, the product title machine 108 may select a machine learning algorithm. For example, the product title machine 108 may select a machine learning algorithm based on a configuration parameter selected by an administrator. The machine learning algorithm may include a support vector machine (SVM) classifier, linear programming algorithm, a regression algorithm, a neural network algorithm, a random forest algorithm, a decision tree algorithm, or the like.

Figure 7B:
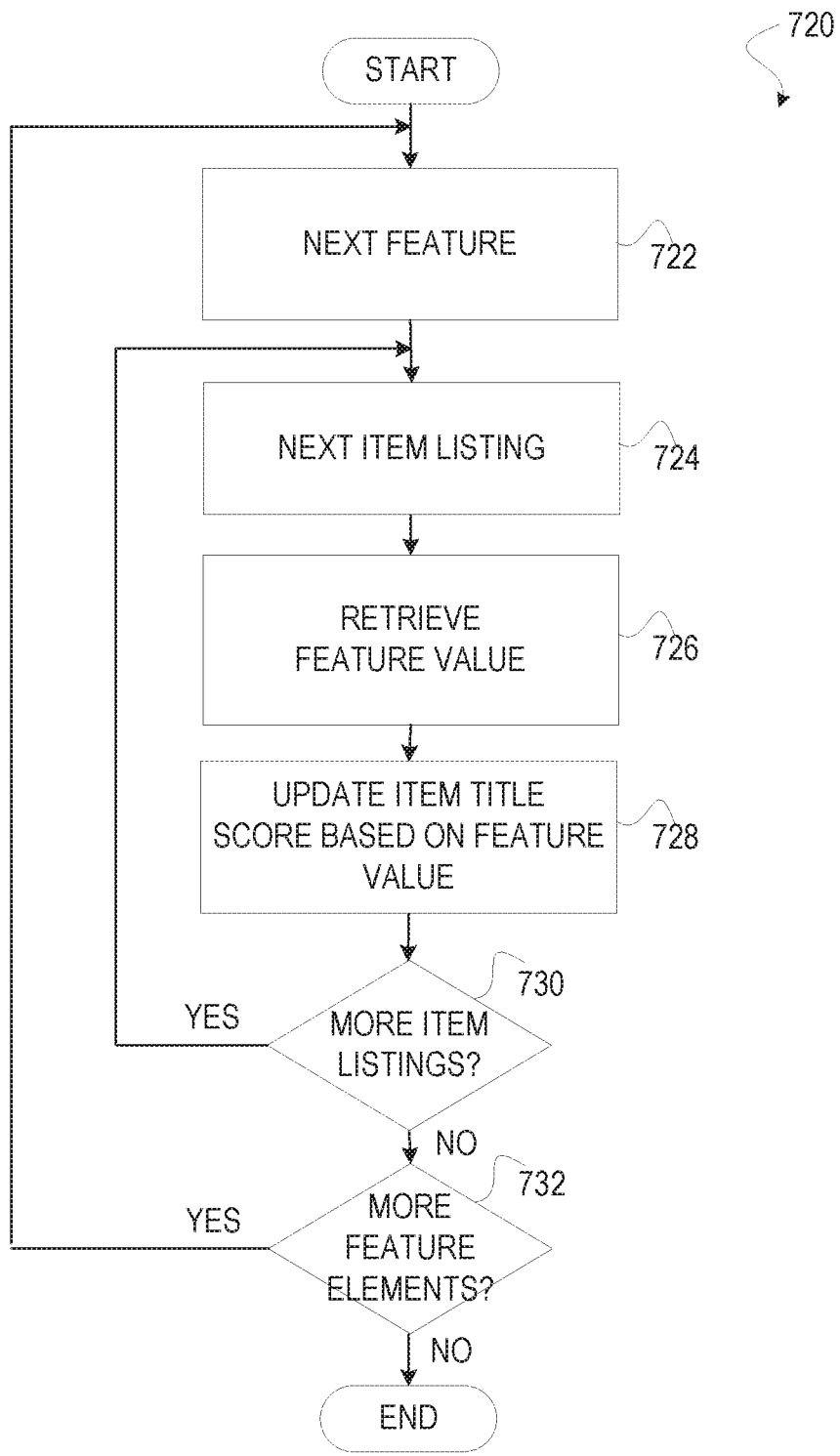
FIG. 7B illustrates a method to evaluate a feature value, according to an embodiment.
Figure 9:
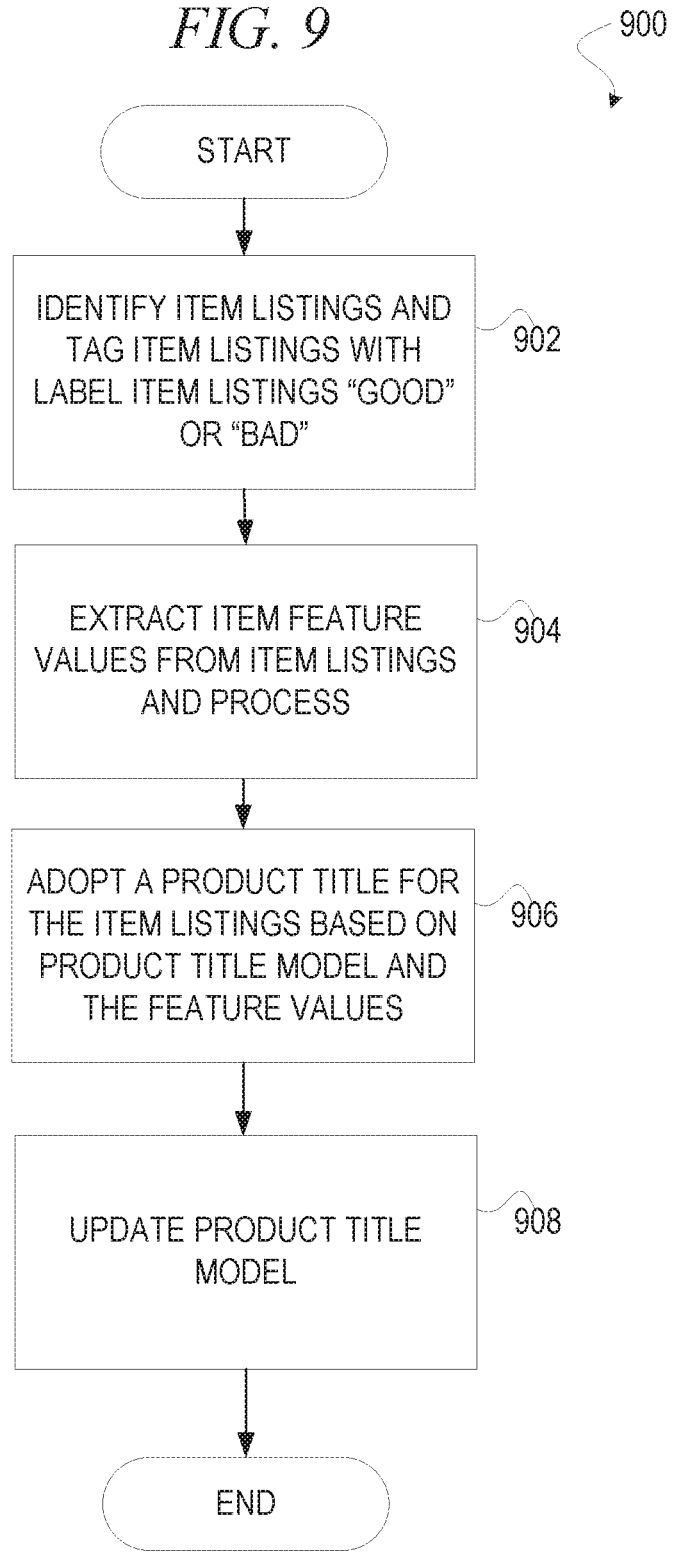
FIG. 9 illustrates a method to train the product title model, according to an embodiment.

At operation 706, the product title machine 108 utilizes the product title model 110 to analyze the extracted and, optionally, preprocessed item feature values and the extracted and preprocessed product feature values to generate item title scores for each of the item listings 114. In the present example, the product title machine 108 may generate item title scores for each of the five-hundred item listings 114. For example, the product title machine 108 may generate the item title scores by evaluating the item feature values and product feature values associated with each of the item titles 400 in the set of item listings 114 in accordance with method 720 as illustrated in FIG. 7B. Also, the training of the product title model 110 is described in method 900, as illustrated in FIG. 9.

Returning to FIG. 7A, at operation 708, the product title machine 108 identifies the item title 400 with the highest item title score as the product title 122 and stores the product title 122 in association with the product identifier 202 in the product title directory 111. For example, the product title machine 108 may identify the item title 400, "Apple iPod. Touch 3$^{rd}$ Generation," in the 125$^{th}$ item listing 114 as being associated with the highest item title score and store the item title 400 as the product title 122 in association with the product identifier 202 (e.g., UPC 123456) in the product title directory 111.

FIG. 7B illustrates a method 720 to evaluate a feature value. The method 720 commences at operation 722 with the product title module 106 incrementing to the next feature element 300. In the present example, the product title module 106 increments to the first feature element 300 in the product title model 110. Accordingly, the feature element 300 is registered as the feature element 300 that is current.

At operation 724, the product title module 106 increments to the next item listing 114 in the set of item listings 114. In the present example, the product title module 106 increments to the first item listing 114 in the set of five hundred item listings 114 being utilized to identify a product title 122. Accordingly, the first item listing 114 is registered as the item listing 114 that is current.

At operation 726, the product title module 106 retrieves the feature value that was previously generated for the item listing 114. For example, the operation 604 in FIG. 6 may have performed an extraction and preliminary processing for the item listing 114 based on the feature listing information 308. In some instances, preprocessing was further performed to generate the item feature value. In the case of a product feature, the preprocessing may be based on a value the was generated based on all of the item listings 114 for the product. Returning to FIG. 7B.

At operation 728, the product title module 106 updates the item title score associated with the item title 400 for the present item listing 114. The product title machine 108 may utilize the learning saved in the product title model 110 to update the item title score. For example, the product title machine 108 may utilize learning in the form of feature weight information 310 that was saved in training the product title model 110.

At decision operation 730, the product title module 106 identifies whether there are more item listings 114. If there are more item listings 114, then the product title module 106 branches to operation 724. Otherwise, the product title module 106 branches to decision operation 732.

At decision operation 732, the product title module 106 identifies whether there are more feature elements 300. If there are more feature elements 300, then the product title module 106 branches to operation 722. Otherwise, processing continues at operation 706 on FIG. 7A.

FIG. 8 illustrates a method 800 to extract and process feature values. The method 800 commences at operation 802 with the product title module 106 incrementing to the next feature element 300. In the present example, the product title module 106 increments to the first feature element 300 in the product title model 110. Accordingly, the first feature element 300 is registered as the feature element 300 that is current.

At operation 804, the product title module 106 increments to the next item listing 114 in the set of item listings 114. In the present example, the product title module 106 increments to the first item listing 114 in a set of five hundred item listings 114 (e.g., product) being utilized to identify a product title 122. Accordingly, the first item listing 114 is registered as the item listing 114 that is current.

At operation 806, the product title module 106 extracts data from an item listing in accordance with the identified feature element 300. For example, the product title module 106 may extract data from an item listing 114 based on the feature listing information 308, as previously described.

At operation 808, the product title module 106 may perform preliminary processing based on the extracted data. For example, the product title module 106 may optionally perform preliminary processing based on the feature listing information 308, as previously described.

At decision operation 810, the product title module 106 identifies whether there are more item listings 114. If there are more item listings 114, then the product title module 106 branches to operation 804. Otherwise, the product title module 106 branches to decision operation 811.

At decision operation 811, the product title module 106 identifies whether the feature element 300 that is current is directed at a product feature or an item feature. For example, the product title module 106 may identify that the current feature element 300 is directed at a product feature based on the feature type information 304 stored for the feature element 300 that is current. If the feature element 300 that is current is directed at a product feature, then the product title module 106 branches to operation 813. Otherwise, the product title module 106 branches to decision operation 812.

At operation 813, the product title module 106 performs preliminary processing to generate product feature values for each of the item listings 114 in the set of five hundred item listings 114 (e.g., product).

At decision operation 812, the product title module 106 identifies whether there are more feature elements 300. If there are more feature elements 300, then the product title module 106 branches to operation 802. Otherwise, processing continues at operation 604 on FIG. 6 or at operation 906 on FIG. 9.

Example of Item Feature

In the method 800, the product title module 106 may extract item feature values from item listings 114 and preprocess the extracted values to generate extracted and preprocessed item feature values. The processed item feature values may include a Boolean value, a category value, or a continuous value.

For example, the product title module 106 may generate an item feature Boolean value based on a "condition" being present in an item title 400. Continuing with the example, the product title module 106, at operation 806, may extract the item title 400 from the item listing 114 that is current in the set of item listings 114 (e.g. five-hundred item listings 114 comprising a product). Further, the product title module 106, at operation 808, may parse the item title 400 that is current to identify whether a token expressing condition (e.g., "OLD," "new," "used," etc.) is present in the item title 400, and assert a Boolean value ("PASS, "FAIL") in accordance with the identified condition (e.g., "IS CONDITION" or "IS NOT CONDITION).

The product title machine 108 subsequently evaluates the item feature Boolean value for signifying whether a "condition" is present in an item title 400 that is current (e.g., see method 720 illustrated in FIG. 7B) to generate/update the item title score for the associated item listing 114.

Example of Product Feature

In the method 800, the product title module 106 may extract product feature values from item listings 114 and preprocess the extracted product feature values to generate extracted pre-processed product feature value(s). The processed product feature values may include Boolean, category, or continuous product feature values.

For example, the product title module 106 may generate a processed product feature value in the form of a ratio that measures the number of characters for an item title 400 (e.g. "title size") against the "average number of characters" (e.g. "product title average size") for the product. Continuing with a specific example, the product title module 106, at operation 806, may extract an item title 400 from the item listing 114 that is current. Further, the product title module 106, at operation 808, may parse the item title 400 that is current to identify the number of characters in the item title 400. Further, the product title module 106, at operation 813, sums the number of characters for each item title 400 (e.g. item titles 400 of the five-hundred item listings 114 comprising a product) to generate a total number of characters for the set of item listings 114 (e.g., product), computes an "average number of characters" for the product by dividing the total number of characters by the number of item listings 114, and computes a ratio for the each item title 400 in the set of item listings 114 by dividing by the number of characters in each item title 400 by the "average number of characters."

The product title machine 108 subsequently evaluates the product feature value in the form of a ratio signifying a ratio that measures the number of characters for an item title 400 against the "average number of characters" for the product (e.g., see method 720 illustrated in FIG. 7B) to generate/update an item title score for the associated with item listing 114.

FIG. 9 illustrates a method 900 to train a product title model 110, according to an embodiment. The method 900 commences at operation 902 with the product title module 106 receiving a set of item listings 114 for selecting a product title 122 and a product title model 110 for training. For example, an administrator may identify a set of item listings 114 and tag each of the item listings with a training tag 425 (e.g., training label). The training tag 425 indicates whether an item title 400 in a particular item listing 114 is "good" or "bad." For example, the administrator may store the training tag 425, TRAIN=GOOD, in the structured information 404 of an item listing 114 that includes an item title 400 that the administrator believes exemplifies a "good" item title 400 for naming a product (e.g., set of item listings). Further for example, the administrator may store the training tag 425, TRAIN=BAD, in the structured information 404 of an item listing 114 that includes an item title 400 that the administrator believes exemplifies a "bad" item title 400 for naming a product (e.g., set of item listings).

At operation 904, the product title module 106 extracts feature values from item listings 114 and, optionally, pre-processes the extracted feature values. The feature values include item feature values and product feature values. The operation 904 is further described by method 800, as illustrated in FIG. 8, according to an embodiment.

At operation 906, the product title module 106 invokes the product title machine 108 to adopt a product title 122. For example, the product title module 106 may invoke the product title machine 108 with the extracted pre-processed item feature values, the extracted pre-processed product feature values, and the product title model 110. The operation 608 is further described by method 700, as illustrated in FIG. 7A, according to an embodiment.

Figure 10:
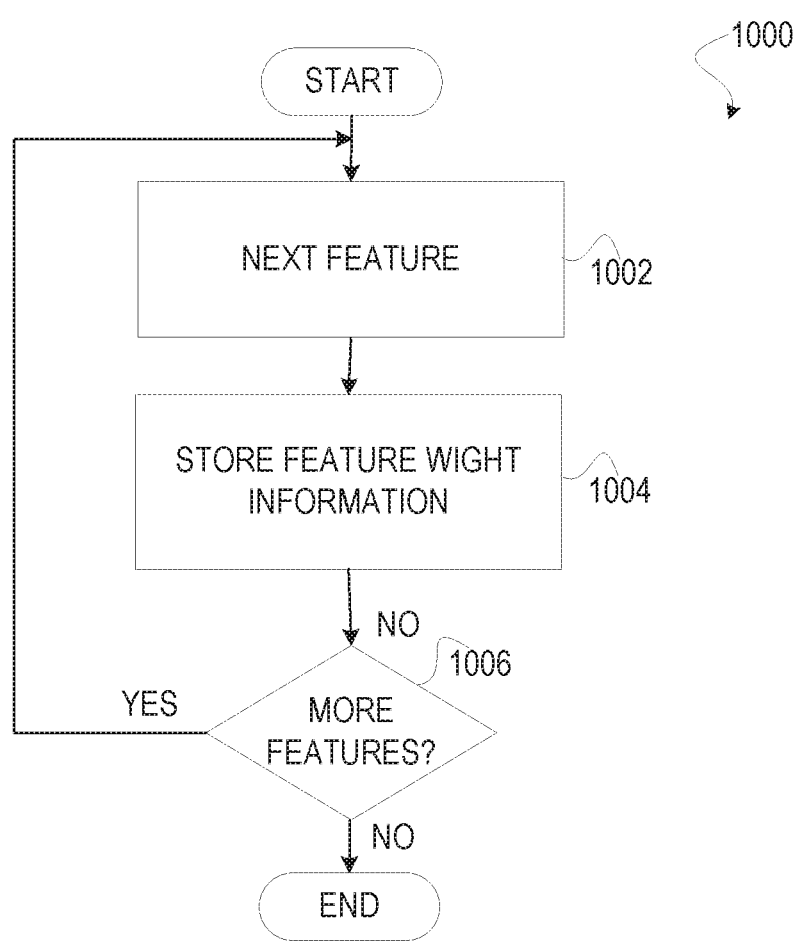
FIG. 10 illustrates a method to update a product title model, according to an embodiment.

At operation 908, the product title module 106 updates the product title model 110 in accordance with the product title 122 that was selected. For example, the product title module 106 may update the feature weight information 310 for a feature element 300 in accordance with its ability to facilitate the selection of a "good" or "bad" product title 122. The operation 908 is further described by method 1000, as illustrated in FIG. 10. The method 900 may be iterated several times with different sets of item listings 114 (e.g., product) to train the product title model 110.

FIG. 10 illustrates a method 1000 to update a product title model 110, according to an embodiment. The method 1000 commences at operation 1002 with the product title module 106 incrementing to the next feature element 300. In the present example, the product title module 106 increments to the first feature element 300 in the product title model 110. Accordingly, the first feature element 300 is registered as the feature element 300 that is current.

At operation 1004, the product title module 106 updates the product title model 110. For example, the product title module 106 may store a feature weight information 310.

Increasing the feature weight information 310 causes the feature element 300 to contribute towards the generation of an item title score that is greater in value. Decreasing the feature weight information 310 causes the feature element 300 to contribute towards the generation of an item title score that is less in value.

At operation 1006, the product title module 106 identifies whether more feature elements 300 are present in the product title model 110. If more feature elements 300 are present, then the product title module 106 branches to operation 1002. Otherwise, processing continues at operation 908 on FIG. 9.

Figure 11:
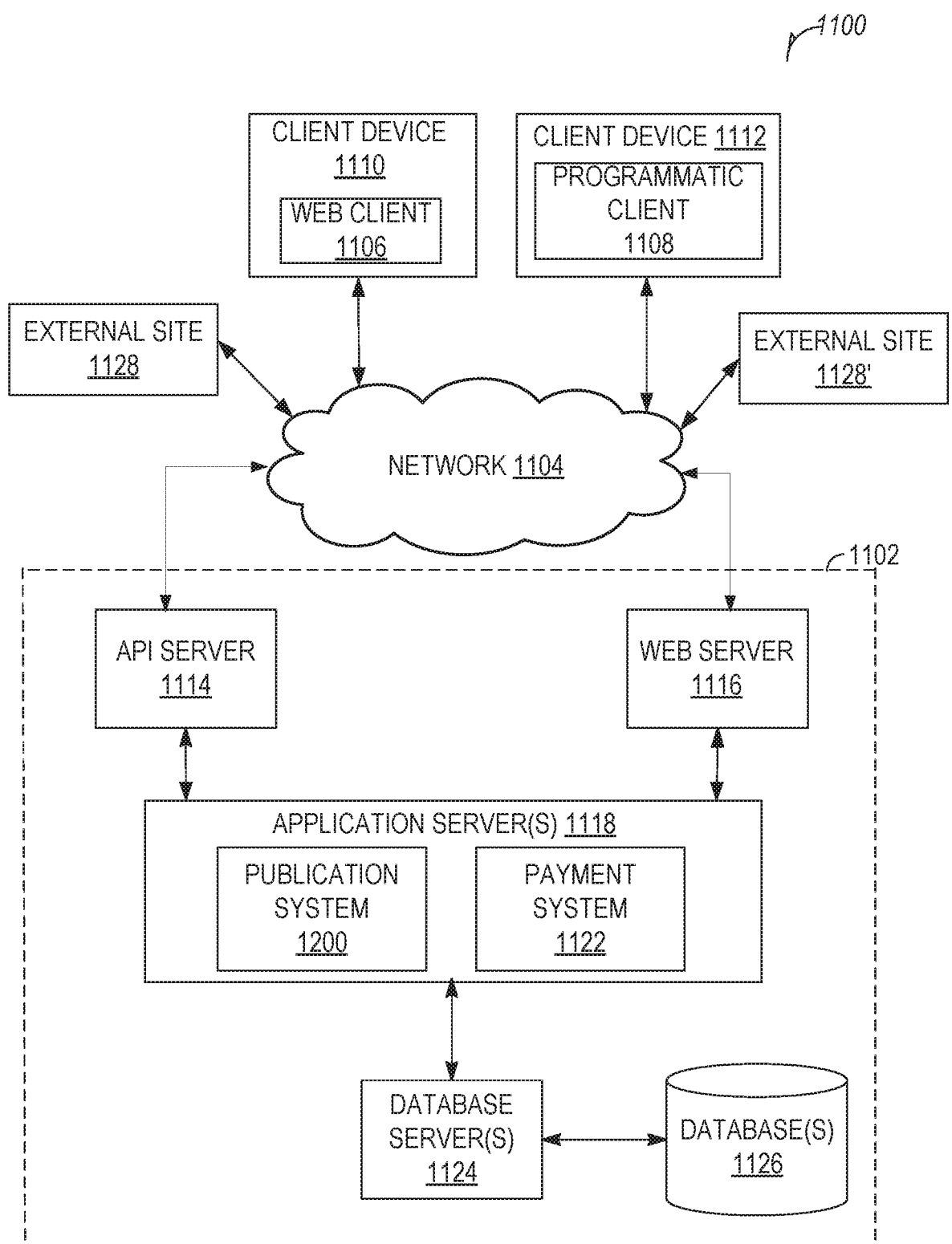
FIG. 11 is a block diagram illustrating an example embodiment of a high-level client-server-based network architecture.

FIG. 11 illustrates network architecture 1100, according to an embodiment. A networked system 1102, in an example form of a network-server-side functionality, is coupled via a communication network 1104 (e.g., the Internet, wireless network, cellular network, or a Wide Area Network (WAN)) to one or more client devices 1110 and 1112. The networked system 1102 corresponds to the system 100 in FIG. 1, the communication network 1104 corresponds to the network 103 in FIG. 1, and the client devices 1110 and 1112 correspond to the client machine 105 in FIG. 6; accordingly, the same or similar references have been used to indicate the same or similar features unless otherwise indicated. FIG. 11 illustrates, for example, a web client 1106 operating via a browser (e.g., such as the INTERNET EXPLORER® browser developed by Microsoft® Corporation of Redmond, Washington State) and a programmatic client 1108 executing on respective client devices 1110 and 1112.

The network architecture 1100 may be utilized to execute any of the methods described in this document. The client devices 1110 and 1112 may comprise a mobile phone, desktop computer, laptop, or any other communication device that a user may utilize to access the networked system 1102. In some embodiments, the client device 1110 may comprise a display module (not shown) to display information (e.g., in the form of user interfaces). In further embodiments, the client device 1110 may comprise one or more of a touch screen, accelerometer, camera, microphone, and a global positioning system (GPS) device. The client devices 1110 and 1112 may be a device of a user that is used to perform a transaction involving digital goods within the networked system 1102. In one embodiment, the networked system 1102 is a network-based marketplace that manages digital goods, publishes publications comprising item listings of products available on the network-based marketplace, and manages payments for these marketplace transactions. Additionally, external sites 1128, 1128' may be sites coupled to networked system 1102 via network 1104. External sites may be any desired system, including ecommerce systems.

An Application Program Interface (API) server 1114 and a web server 1116 are coupled to, and provide programmatic and web interfaces respectively to, one or more application servers 1118. The application server(s) 1118 host a publication system 1200 and a payment system 1122, each of which may comprise one or more modules, applications, or engines, and each of which may be embodied as hardware, software, firmware, or any combination thereof. The application servers 1118 are, in turn, coupled to one or more database servers 1124 facilitating access to one or more information storage repositories or database(s) 1126. In one embodiment, the databases 1126 are storage devices that store information to be posted (e.g., publications or listings) to the publication system 1200. The databases 1126 may also store digital goods information in accordance with example embodiments.

In example embodiments, the publication system 1200 publishes content on a network (e.g., Internet). As such, the publication system 1200 provides a number of publication and marketplace functions and services to users that access the networked system 1102. The publication system 1200 is discussed in more detail in connection with FIG. 12. In example embodiments, the publication system 1200 is discussed in terms of an online marketplace environment. However, it is noted that the publication system 1200 may be associated with a non-marketplace environment such as an informational (e.g., search engine) or social networking environment.

The payment system 1122 provides a number of payment services and functions to users. The payment system 1122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 1200 or elsewhere on the network 1104. The payment system 1122 also facilitates payments from a payment mechanism (e.g., a bank account, PayPal™, or credit card) for purchases of items via any type and form of a network-based marketplace.

While the publication system 1200 and the payment system 1122 are shown in FIG. 11 to both form part of the networked system 1102, it will be appreciated that, in alternative embodiments, the payment system 1122 may form part of a payment service that is separate and distinct from the networked system 1102. Additionally, while the example network architecture 1100 of FIG. 11 employs a client-server architecture, a skilled artisan will recognize that the present disclosure is not limited to such an architecture. The example network architecture 1100 can equally well find application in, for example, a distributed or peer-to-peer architecture system. The publication system 1200 and payment system 1122 may also be implemented as standalone systems or standalone software programs operating under separate hardware platforms, which do not necessarily have networking capabilities.

Figure 12:
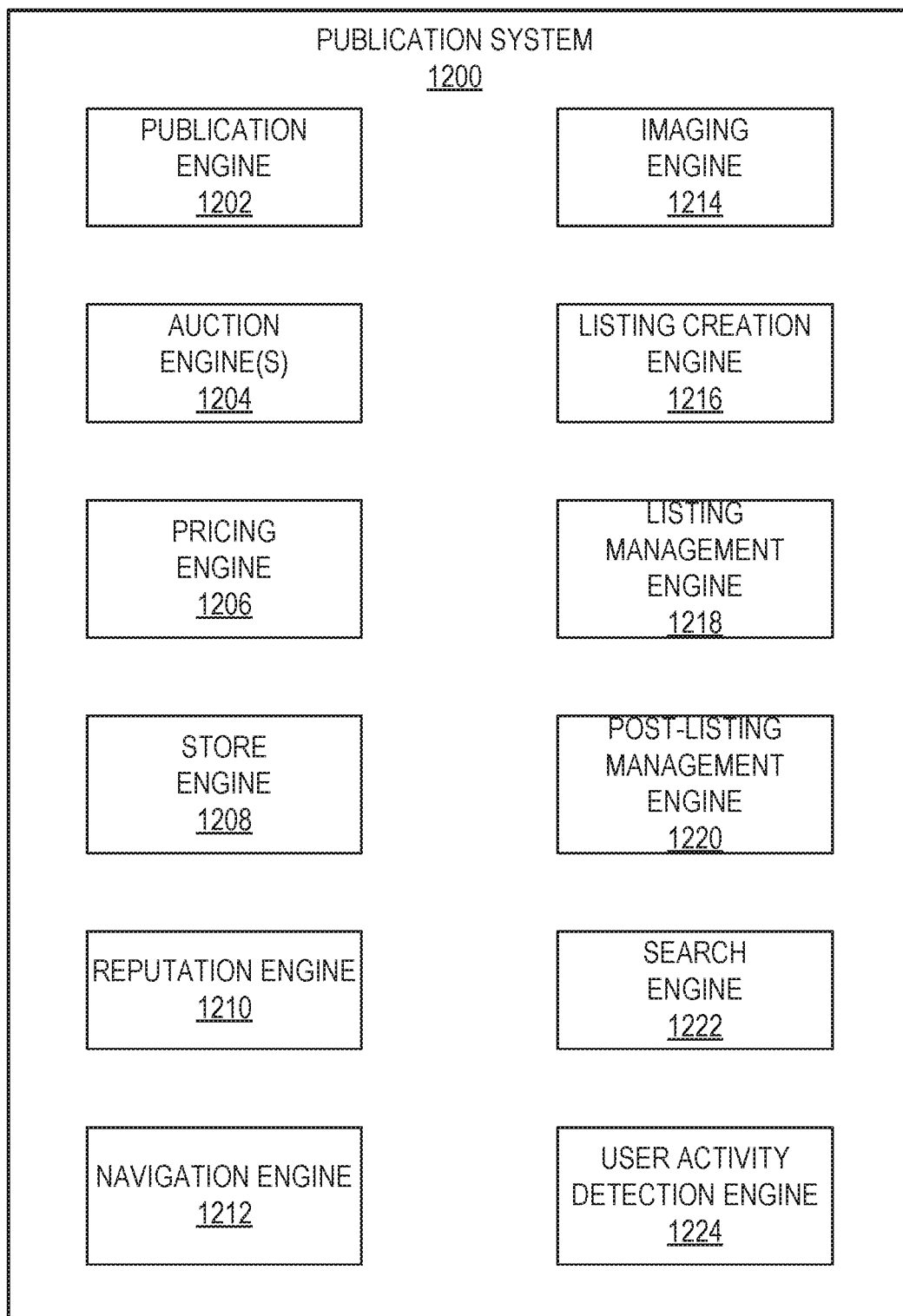
FIG. 12 is a block diagram illustrating an example embodiment of a publication system.

Referring now to FIG. 12, an example block diagram illustrating multiple components that, in one embodiment, are provided within the publication system 1200 of the networked system 1102, is shown. In this embodiment, the publication system 1200 is a marketplace system where items (e.g., goods or services) may be offered for sale and that further implements the features described herein for interactive query generation and refinement. The items may comprise digital goods (e.g., currency, license rights). The publication system 1200 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 1126 via the one or more database servers 1124, as shown in FIG. 11.

Returning to FIG. 12, the publication system 1200 provides a number of publishing, listing, and price-setting mechanisms whereby a buyer may list (or publish information concerning) goods or services for sale, a buyer can express interest in or indicate a desire to purchase such goods or services, and a price can be set for a transaction pertaining to the goods or services. To this end, the publication system 1200 may comprise at least one publication engine 1202 and one or more auction engines 1204 that support auction-format listing and price setting mechanisms (e.g., English, Dutch, Chinese, Double, Reverse auctions, etc.).

A pricing engine 1206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 1208 allows a buyer to group listings within a "virtual" store, which may be branded and otherwise personalized by and for the buyer. Such a virtual store may also offer promotions, incentives, and features that are specific and personalized to the buyer. In one example, the seller may offer a plurality of items as Buy-It-Now items in the virtual store, offer a plurality of items for auction, or a combination of both.

A reputation engine 1210 allows users that transact, utilizing the networked system 1102, to establish, build, and maintain reputations. These reputations may be made available and published to potential trading partners. Because the publication system 1200 supports person-to-person trading between unknown entities, in accordance with one embodiment, users may otherwise have no history or other reference information whereby the trustworthiness and credibility of potential trading partners may be assessed. The reputation engine 1210 allows a user, for example through feedback provided by one or more other transaction partners, to establish a reputation within the network-based marketplace 102 over time. Other potential trading partners may then reference the reputation for purposes of assessing credibility and trustworthiness.

Navigation of the network-based marketplace 102 may be facilitated by a navigation engine 1212. For example, a browse module (not shown) of the navigation engine 1212 allows users to browse various category, catalog, or inventory data structures according to which listings may be classified within the publication system 1200. Various other navigation applications within the navigation engine 1212 may be provided to supplement the browsing applications.

In order to make listings available via the networked system 1102 as visually informing and attractive as possible, the publication system 1200 may include an imaging engine 1214 that enables users to upload images for inclusion within publications and to incorporate images within viewed listings. The imaging engine 1214 may also receive image data from a user as a search query and utilize the image data to identify an item depicted or described by the image data.

A listing creation engine 1216 allows users (e.g., sellers) to conveniently author listings of items. In one embodiment, the listings pertain to goods or services that a user (e.g., a seller) wishes to transact via the publication system 1200. In other embodiments, a user may create a listing that is an advertisement or other form of publication.

A listing management engine 1218 allows users to manage such listings. Specifically, where a particular user has authored or published a large number of listings, the management of such listings may present a challenge. The listing management engine 1218 provides a number of features (e.g., auto-relisting, inventory level monitors, etc.) to assist the user in managing such listings.

A post-listing management engine 1220 also assists users with a number of activities that typically occur post-listing. For example, upon completion of a transaction facilitated by the one or more auction engines 1204, a buyer may wish to leave feedback regarding a particular seller. To this end, the post-listing management engine 1220 provides an interface to the reputation engine 1210 allowing the buyer to conveniently provide feedback regarding multiple sellers to the reputation engine 1210. Another post-listing action may be shipping of sold items whereby the post-listing management engine 1220 may assist in printing shipping labels, estimating shipping costs, and suggesting shipping carriers.

A search engine 1222 performs searches for publications in the networked system 1102 that match a query. In example embodiments, the search engine 1222 comprises a search module (not shown) that enables keyword searches of publications published via the publication system 1200. Further, for example, the search engine 1222 may perform the functions previously described in reference to the search engine 1222. In a further embodiment, the search engine 1222 may take an image received by the imaging engine 1214 as an input for conducting a search. The search engine 1222 takes the query input and determines a plurality of matches from the networked system 1102 (e.g., publications stored in the database 1126). It is noted that the functions of the search engine 1222 may be combined with the navigation engine 1212. The search engine 1222, in the publication system 1200, may perform the functionality previously described with respect to the search engine 1222.

A user activity detection engine 1224 in FIG. 12 may monitor user activity during user sessions and detect a change in the level of user activity that, as discussed in more detail below, may predict that a user is about to make a purchase. The exact amount of change in the level of user activity may vary. A general guideline may be to monitor across multiple sessions and detect any significant increase over time (for example, the activity level doubling or tripling in a short span). In one embodiment, when the user activity detection engine 1224 detects such a condition, the ecommerce system may make an intervention to provide content for display to the user in an effort to improve the probability that the user will make a purchase, and/or also to motive the user to make the purchase on the ecommerce system site instead of moving to a competitor site in search of a better purchase. Stated another way, activity over time and at different times before a purchase action provides an opportunity to personalize marketing to a user, based on time, by intervention as discussed above. Additional examples of including a temporal frame in that marketing personalization are discussed below. The publication system 1200 may further include the product title applications 104, as previously described.

Although the various components of the publication system 1200 have been defined in terms of a variety of individual modules and engines, a skilled artisan will recognize that many of the items can be combined or organized in other ways and that not all modules or engines need to be present or implemented in accordance with example embodiments. Furthermore, not all components of the publication system 1200 have been included in FIG. 12. In general, components, protocols, structures, and techniques not directly related to functions of exemplary embodiments (e.g., dispute resolution engine, loyalty promotion engine, personalization engines) have not been shown or discussed in detail. The description given herein simply provides a variety of exemplary embodiments to aid the reader in an understanding of the systems and methods used herein.

Data Structures

Figure 13:
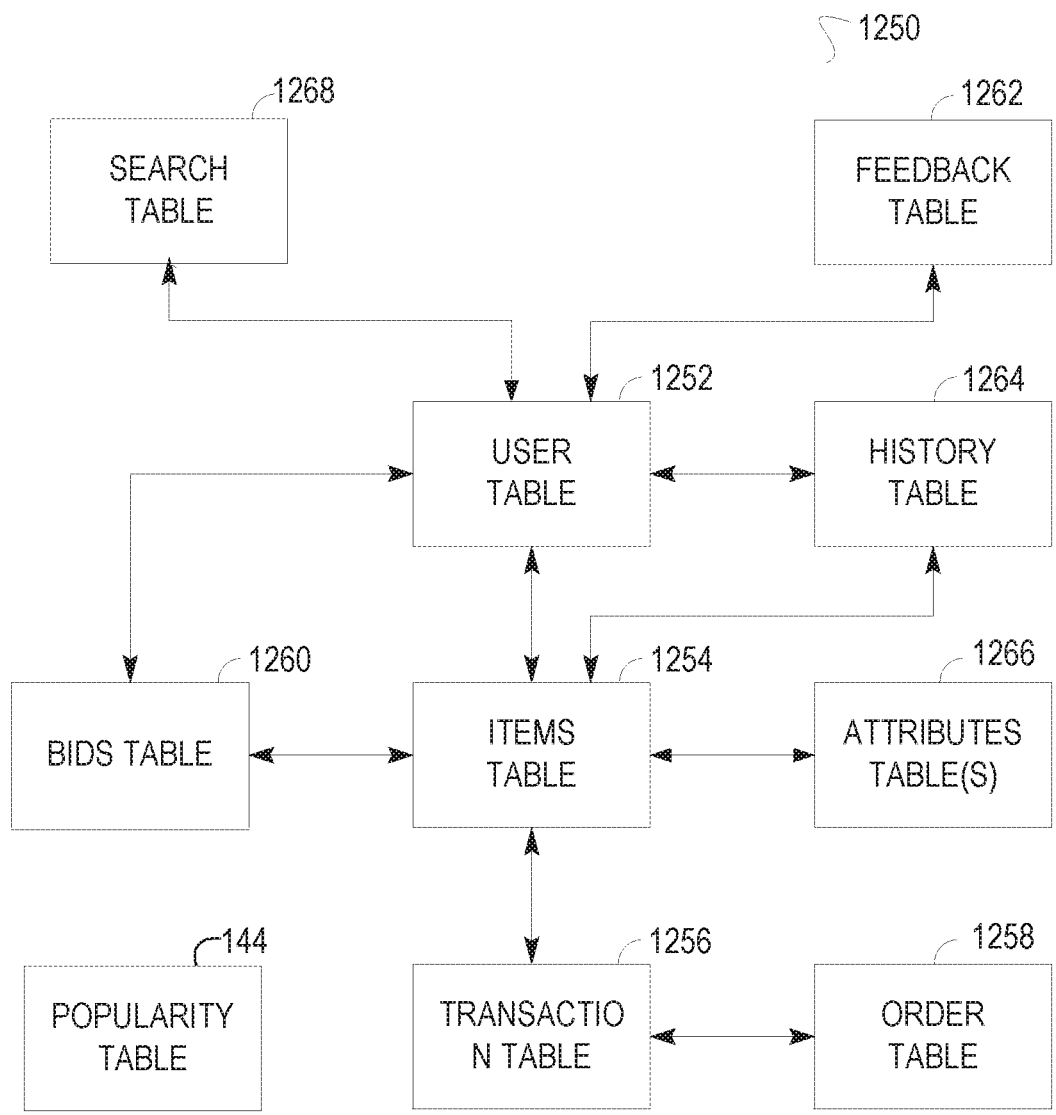
FIG. 13 is a block diagram illustrating tables that are utilized by the publication system, according to an embodiment.

FIG. 13 is a high-level entity-relationship diagram, illustrating various tables 1250 that may be maintained within the databases 1126 of FIG. 11, and that are utilized by and support the publication system 1200 and payment system 1122, both of FIG. 11. A user table 1252 may contain a record for each of the registered users of the networked system 1102 (e.g., network-based marketplace 102) of FIG. 11 and FIG. 1. A user may operate as a seller, a buyer, or both, within the network-based marketplace 102 (e.g., FIG. 11 and FIG. 1). In one example embodiment, a buyer may be a user that has accumulated value (e.g., commercial or proprietary currency), and is accordingly able to exchange the accumulated value for items that are offered for sale by the network-based marketplace 102.

The tables 1250 may also include an items table 1254 (e.g., items table 142) in which item records (e.g., listings) are maintained for goods and services (e.g., items) that are available to be, or have been, transacted via the network-based marketplace 102. Item records (e.g., listings) within the items table 1254 may furthermore be linked to one or more user records within the user table 1252, so as to associate a seller and one or more actual or potential buyers with an item record (e.g., listing). A transaction table 1256 may contain a record for each transaction (e.g., a purchase or sale transaction or auction) pertaining to items for which records exist within the items table 1254. An order table 1258 may be populated with order records, with each order record being associated with an order. Each order, in turn, may be associated with one or more transactions for which records exist within the transaction table 1256. Bid records within a bids table 1260 may relate to a bid received at the network-based marketplace 102 in connection with an auction-format listing supported by the auction engine(s) 1204 of FIG. 12. A feedback table 1262 may be utilized by one or more reputation engines 1210 of FIG. 12, in one example embodiment, to construct and maintain reputation information concerning users in the form of a feedback score. A history table 1264 may maintain a history of transactions to which a user has been a party. One or more attributes tables 1266 may record attribute information that pertains to items for which records exist within the items table 1254. Considering only a single example of such an attribute, the attributes tables 1266 may indicate a currency attribute associated with a particular item, with the currency attribute identifying the currency of a price for the relevant item as specified by a seller. A search table 1268 may store search information that has been entered by a user (e.g., a buyer) who is looking for a specific type of listing. The tables 1250 may include the product title information 109, as previously described.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces ((e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in the present application are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of things," while yet another combination produces a server computer for use within a cloud computing architecture. Not all combinations of such software and hardware architectures are presented here as those of skill in the art can readily understand how to implement the subject matter of the disclosure in different contexts from the disclosure contained herein.

Software Architecture

Figure 14:
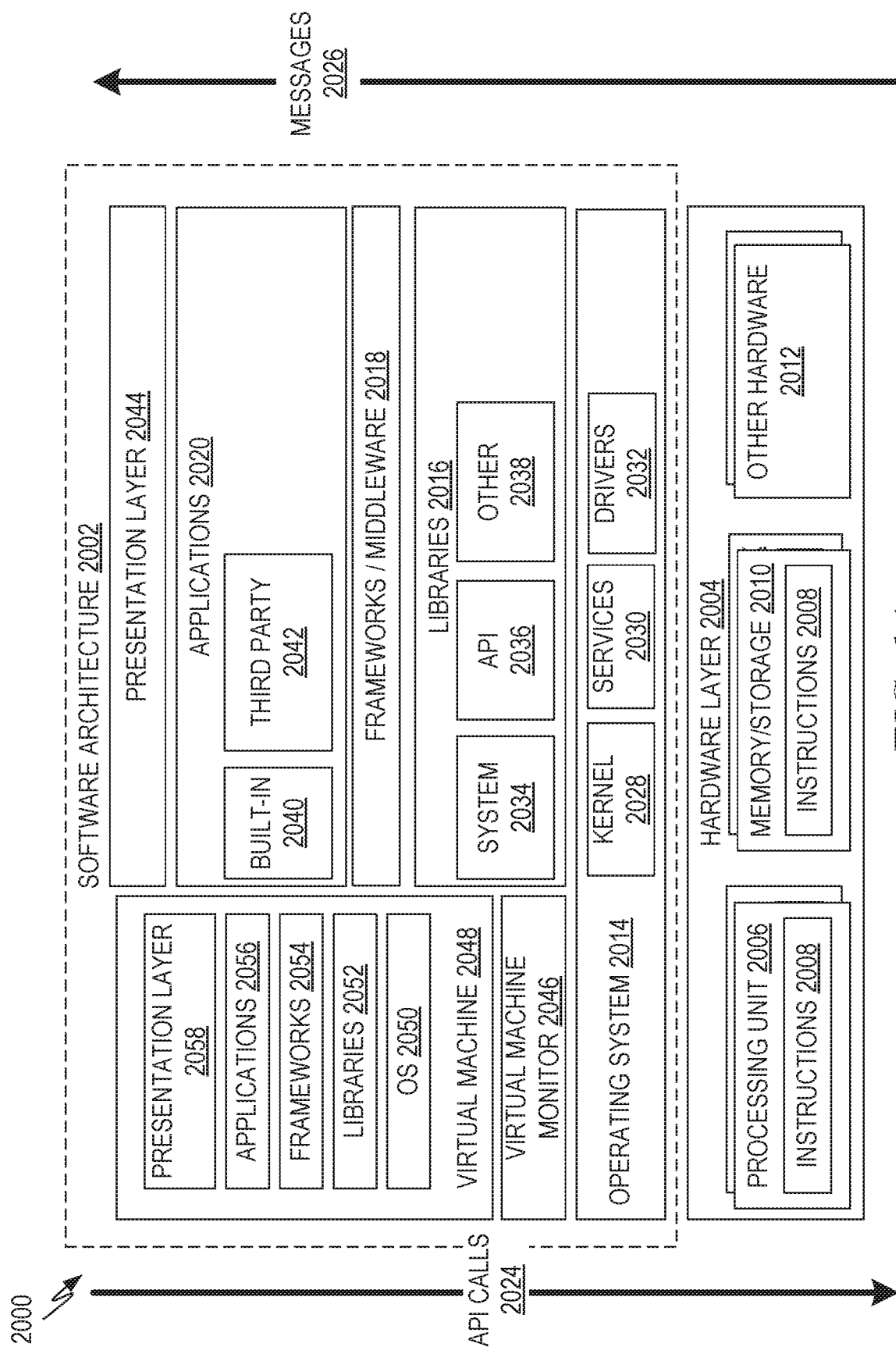
FIG. 14 is a block diagram illustrating a software architecture, according to an embodiment.

FIG. 14 is a block diagram 2000 illustrating a representative software architecture 2002, which may be used in conjunction with various hardware architectures herein described. FIG. 14 is merely a non-limiting example of a software architecture and it will be appreciated that many other architectures may be implemented to facilitate the functionality described herein. The software architecture 2002 may be executing on hardware such as machine 2100 of FIG. 15 that includes, among other things, processors 2110, memory/storage 2130, and input/output (I/O) components 2150. A representative hardware layer 2004 is illustrated and can represent, for example, the machine 2100 of FIG. 15. The representative hardware layer 2004 comprises one or more processing units 2006 having associated executable instructions 2008. Executable instructions 2008 represent the executable instructions 2008 of the software architecture 2002, including implementation of the methods and modules in the present application. Hardware layer 2004 also includes memory and/or storage modules 2010, which also have executable instructions 2008. Hardware layer 2004 may also comprise other hardware 2012, which represents any other hardware of the hardware layer 2004, such as the other hardware illustrated as part of machine 2100.

In the example architecture of FIG. 14, the software architecture 2002 may be conceptualized as a stack of layers where each layer provides particular functionality. For example, the software architecture 2002 may include layers such as an operating system 2014, libraries 2016, frameworks/middleware 2018, applications 2020, and presentation layer 2044. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules, as described herein.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042 and/or product title applications 104 and the like. Examples of representative built-in applications 2040 may include, but are not limited to, a contacts application, a browser application, a book reader application, a location application, a media application, a messaging application, and/or a game application. Third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2042 may invoke the API calls 2024 provided by the mobile operating system such as operating system 2014 to facilitate functionality described herein.

The applications 2020 may utilize built-in operating system functions (e.g., kernel 2028, services 2030 and/or drivers 2032), libraries (e.g., system libraries 2034, API libraries 2036, and other libraries 2038), frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures utilize virtual machines. In the example of FIG. 14, this is illustrated by virtual machine 2048. A virtual machine 2048 creates a software environment where applications 2020/modules can execute as if they were executing on a hardware machine (such as the machine 2100 of FIG. 15, for example). A virtual machine 2048 is hosted by a host operating system (operating system 2014 in FIG. 17) and typically, although not always, has a virtual machine monitor 2046, which manages the operation of the virtual machine 2048 as well as the interface with the host operating system (i.e., operating system 2014). A software architecture executes within the virtual machine 2048 such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 15:
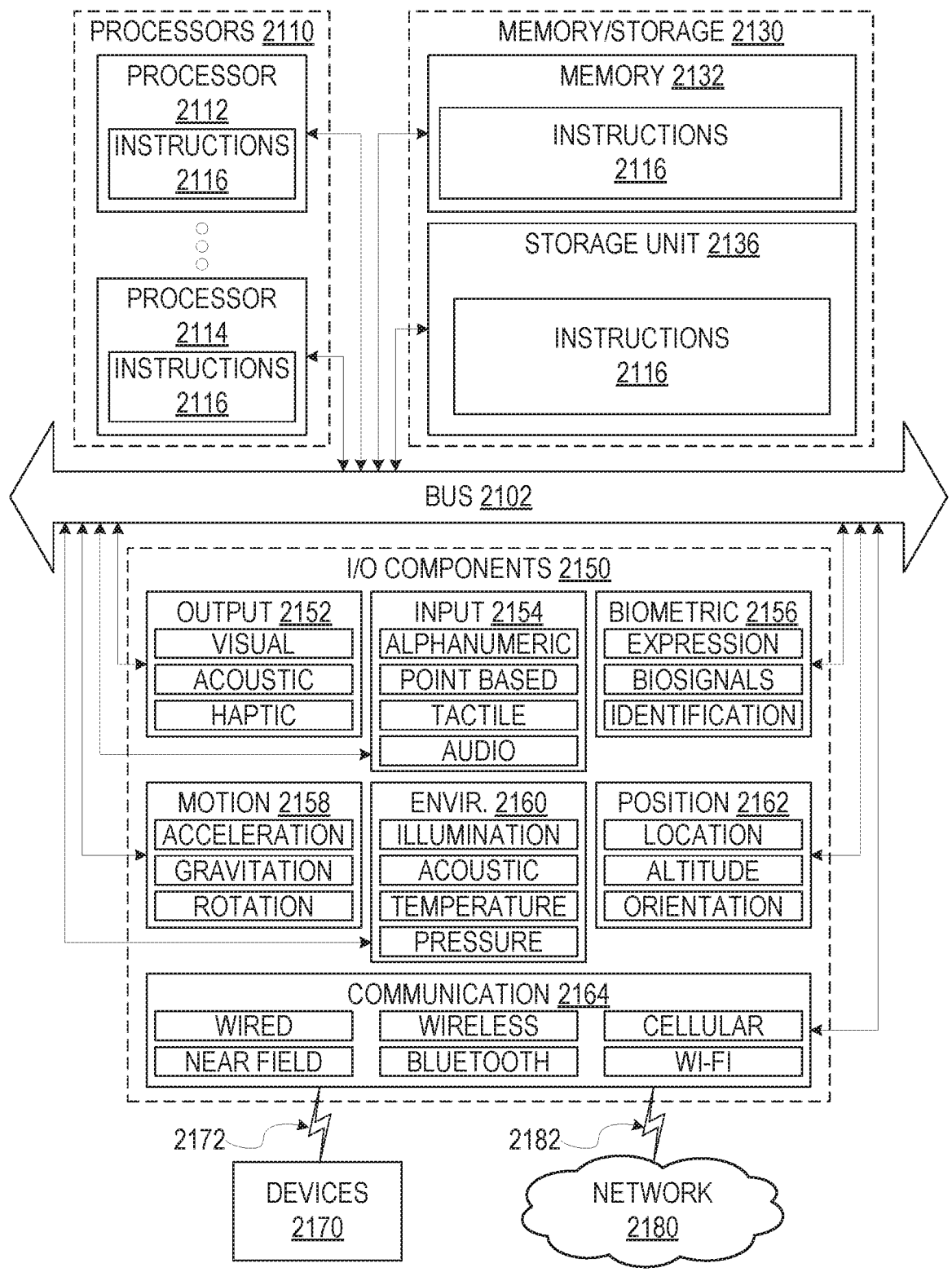
FIG. 15 is a block diagram of a machine in an example form of a computing system within which a set of instructions for causing the machine to perform any one or more of the methodologies discussed herein may be executed.

FIG. 15 is a block diagram illustrating components of a machine 2100, according to some example embodiments, able to read instructions 2116 from a machine-readable medium (e.g., a machine-readable storage medium) and perform any one or more of the methodologies discussed herein. Specifically, FIG. 15 shows a diagrammatic representation of the machine 2100 in the example form of a computer system, within which instructions 2116 (e.g., software, a program, an application 2020, an applet, an app, or other executable code) for causing the machine 2100 to perform any one or more of the methodologies discussed herein may be executed. For example, the instructions 2116 may cause the machine 2100 to execute the flow diagrams of FIGS. 6-10. Additionally, or alternatively, the instructions 2116 may implement the system 100 of FIG. 1, the architecture 1100 of FIG. 11, and so forth. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, processor 2112 and processor 2114 that may execute instructions 2116. The term "processor" is intended to include a multi-core processor 2110 that may comprise two or more independent processors 2112, 2114 (sometimes referred to as "cores") that may execute instructions 2116 contemporaneously. Although FIG. 15 shows multiple processors 2112, 2114, the machine 2100 may include a single processor 2112 with a single core, a single processor 2112 with multiple cores (e.g., a multi-core processor), multiple processors 2112, 2114 with a single core, multiple processors 2112, 2114 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine 2100. For example, portable machines such as mobile phones will likely include a touch input device or other such input mechanisms, while a headless server machine will likely not include such a touch input device. It will be appreciated that the I/O components 2150 may include many other components that are not shown in FIG. 15. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as UPC bar code, multi-dimensional bar codes such as Quick Response (QR) code, Aztec code, Data, Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geo-location, location via Wi-Fi® signal triangulation, location via detecting an NEC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed.

Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

We claim:

1. A system for suggesting a title for an item listing of a network-based marketplace, comprising:
at least one hardware processor and instructions accessible on a computer-readable medium that, when executed, cause the at least one hardware processor to perform operations comprising:
identifying a plurality of item listings respectively describing items being offered for sale on the network-based marketplace, the identifying being based at least in part on each item listing including a product identifier that matches and is not associated with any product title on the network-based marketplace, the plurality of item listings including a corresponding plurality of item titles and a first item listing;
generating a plurality of item feature values from the plurality of item listings, each of the plurality of item feature values characterizing one item listing of the plurality of the item listings;
determining a plurality of product feature values from the plurality of item listings, each of the plurality of product feature values describing a comparison between one item listing of the plurality of item listings and multiple item listings of the plurality of item listings;
inputting one or more sets of item listings to a machine learning model;
receiving a training tag from an operator for the one or more sets of item listings to train the machine learning model to adopt at least one of the plurality of item titles for the one or more sets of item listings based on the product identifier, wherein the training tag classifies the at least one of the plurality of item titles as good for naming a product or bad for naming a product;
training the machine learning model based at least in part on inputting the one or more sets of item listings and the training tag;
adjusting, using the machine learning model, a plurality of weightings of the machine learning model for the plurality of product feature values;

weighting the plurality of item feature values and the plurality of product feature values in accordance with the adjustments to the plurality of weightings of the machine learning model;

analyzing the plurality of item feature values and the plurality of product feature values using the machine learning model to generate a plurality of item title scores corresponding to the plurality of item titles based at least in part on the weighting of the plurality of item feature values and the plurality of product feature values;

adopting, using the machine learning model, a product title from the at least one of the plurality of item titles based at least in part on the plurality of item title scores;

generating a product user interface suggesting the product title for the first item listing; and communicating the product user interface to a client machine.

2. The system of claim 1, wherein the operations further comprise enriching the product title, wherein the enriching includes reformatting a letter in the product title.

3. The system of claim 2, wherein the reformatting the letter includes formatting the letter as uppercase.

4. The system of claim 1, wherein the operations further comprise training the machine learning model based at least in part on a second plurality of items.

5. The system of claim 1, wherein the product identifier is selected from a group of product identifiers comprising a global trade item number (GTIN), a manufacture part number (MPN), and a universal product code (UPC), and a European article number (EAN), a Japanese Article number (JAN), and an international standard book number (ISBN).

6. The system of claim 1, wherein the operations further comprise generating the plurality of item title scores including title scores that are respectively associated with the item titles included in the plurality of item titles.

7. The system of claim 1, where the plurality of product values includes a second product value including a Boolean describing whether a most frequently used token is included in a first item title.

8. The system of claim 1, where the plurality of item feature values includes a first item feature value describing a range of title sizes.

9. The system of claim 1, wherein the determining of the plurality of product feature values comprises determining a first product feature value of the plurality of product feature values as an average title length of the plurality of item listings, and wherein the determining of the plurality of item feature values comprises determining a first item feature value as a title length of the first item listing.

10. The system of claim 1, wherein the determining of at least some of the plurality of product feature values characterizing item listing titles of at least two of the plurality of item listings exclude non-title values of the at least two of the plurality of item listings in the characterization.

11. The system of claim 1, wherein the identifying the plurality of item listings based at least in part on each item listing including the product identifier that matches and is not associated with the product title on the network-based marketplace further comprises:

identifying the first item listing of the plurality of item listings that has not been initialized with a title or contains a null value as the title.

12. The system of claim 1, wherein iteratively training of the machine learning model further comprises:

iteratively training, using a training set of item listings that respectively include item titles and a respective tag value assigned to each of the item titles, the machine learning model to differentiate between a first type of title and a second type of title.

13. A method for suggesting a title for an item listing of a network-based marketplace, comprising:

identifying a plurality of item listings respectively describing items being offered for sale on the network-based marketplace, the identifying being based at least in part on each item listing including a product identifier that matches and is not associated with any product title on the network-based marketplace, the plurality of item listings including a corresponding plurality of item titles and a first item listing;

generating, by at least one hardware processor, a plurality of item feature values from the plurality of item listings, each of the plurality of item feature values characterizing one item listing of the plurality of the item listings;

determining, by the at least one hardware processor, a plurality of product feature values from the plurality of item listings, each of the plurality of product feature values describing a comparison between one item listing of the plurality of item listings and multiple item listings of the plurality of item listings;

inputting one or more sets of item listings to a machine learning model;

receiving a training tag from an operator for the one or more sets of item listings to train the machine learning model to adopt at least one of the plurality of item titles for the one or more sets of item listings based on the product identifier, wherein the training tag classifies the at least one of the plurality of item titles as good for naming a product or bad for naming a product;

training the machine learning model based at least in part on inputting the one or more sets of item listings and the training tag;

adjusting, using the machine learning model, a plurality of weightings of the machine learning model for the plurality of product feature values;

weighting the plurality of item feature values and the plurality of product feature values in accordance with the adjustments to the plurality of weightings of the machine learning model;

analyzing the plurality of item feature values and the plurality of product feature values using the machine learning model to generate a plurality of item title scores corresponding to the plurality of item titles based at least in part on the weighting of the plurality of item feature values and the plurality of product feature values;

adopting, using the machine learning model, a product title from the at least one of the plurality of item titles based at least in part on the plurality of item title scores;

generating a product user interface suggesting the product title for the first item listing; and communicating the product user interface to a client machine.

14. The method of claim 13, further comprising enriching the product title, wherein the enriching includes reformatting a letter in the product title.

15. The method of claim 14, wherein the reformatting the letter includes formatting the letter as uppercase.

16. The method of claim 13, wherein the product identifier is selected from a group of product identifiers comprising a global trade item number (GTIN), a manufacture part number (MPN), and a universal product code (UPC), and a European article number (EAN), a Japanese Article number (JAN), and an international standard book number (ISBN).

17. The method of claim 13, further comprising generating the plurality of title scores including title scores that are respectively associated with the item titles included in the plurality of item titles.

18. The method of claim 13, where the plurality of product values includes a second product value including a Boolean describing whether a most frequently used token is included in a first item title.

19. The method of claim 13, where the plurality of item values includes a first item value describing a range of title sizes.

20. A non-transitory machine-readable hardware storage device storing a set of instructions that, when executed by a processor of a machine, cause the machine to perform operations to suggest a title for an item listing of a network-based marketplace, the operations comprising:

identifying a plurality of item listings respectively describing items being offered for sale on the network-based marketplace, the identifying being based at least in part on each item listing including a product identifier that matches and is not associated with any product title on the network-based marketplace, the plurality of item listings including a corresponding plurality of item titles and a first item listing;

generating a plurality of item feature values from the plurality of item listings, each of the plurality of item feature values characterizing one item listing of the plurality of the item listings;

determining a plurality of product feature values from the plurality of item listings, each of the plurality of product feature values describing a comparison between one item listing of the plurality of item listings and multiple item listings of the plurality of item listings;

inputting one or more sets of item listings to a machine learning model;

receiving a training tag from an operator for the one or more sets of item listings to train the machine learning model to adopt at least one of the plurality of item titles for the one or more sets of item listings based on the product identifier, wherein the training tag classifies the at least one of the plurality of item titles as good for naming a product or bad for naming a product;

training the machine learning model based at least in part on inputting the one or more sets of item listings and the training tag;

adjusting, using the machine learning model, a plurality of weightings of the machine learning model for the plurality of product feature values;

weighting the plurality of item feature values and the plurality of product feature values in accordance with the adjustments to the plurality of weightings of the machine learning model;

analyzing the plurality of item feature values and the plurality of product feature values using the machine learning model to generate a plurality of item title scores corresponding to the plurality of item titles based at least in part on the weighting of the plurality of item feature values and the plurality of product feature values;

adopting, using the machine learning model, a product title from the at least one of the plurality of item titles based at least in part on the plurality of item title scores, generated using the machine learning model, corresponding to the plurality of item titles;

generating a product user interface suggesting the product title for the first item listing; and communicating the product user interface to a client machine.

* * * * *